United States Patent
Howell et al.

(10) Patent No.: US 11,721,183 B2
(45) Date of Patent: Aug. 8, 2023

(54) METHODS AND APPARATUS REGARDING ELECTRONIC EYEWEAR APPLICABLE FOR SENIORS

(71) Applicant: IpVenture, Inc., San Jose, CA (US)

(72) Inventors: Thomas A. Howell, San Jose, CA (US); David Chao, Saratoga, CA (US); C. Douglass Thomas, Saratoga, CA (US); Peter P. Tong, Mountain View, CA (US)

(73) Assignee: IngenioSpec, LLC, San Jose, CA (US)

( * ) Notice: Subject to any disclaimer, the term of this patent is extended or adjusted under 35 U.S.C. 154(b) by 0 days.

(21) Appl. No.: 16/987,781

(22) Filed: Aug. 7, 2020

(65) Prior Publication Data
US 2020/0364992 A1 Nov. 19, 2020

Related U.S. Application Data

(63) Continuation of application No. 16/382,036, filed on Apr. 11, 2019, now Pat. No. 10,777,048.
(Continued)

(51) Int. Cl.
*G08B 21/04* (2006.01)
*G08B 3/10* (2006.01)
(Continued)

(52) U.S. Cl.
CPC ............... *G08B 3/10* (2013.01); *G02C 11/10* (2013.01); *G06F 3/167* (2013.01); *G08B 21/043* (2013.01);
(Continued)

(58) Field of Classification Search
CPC ....... G02C 5/008; G02C 11/10; A61B 5/0002; H04W 4/029; G08B 21/043; G08B 21/0446; G08B 25/016
See application file for complete search history.

(56) References Cited

U.S. PATENT DOCUMENTS

| 320,558 A | 6/1885 | Hull |
| 669,949 A | 3/1901 | Underwood |

(Continued)

FOREIGN PATENT DOCUMENTS

| CA | 2 487 391 | 12/2003 |
| CN | 88203065 | 11/1988 |

(Continued)

OTHER PUBLICATIONS

Notice of Allowance for U.S. Appl. No. 16/031,046 dated Jul. 6, 2020.
(Continued)

*Primary Examiner* — Benyam Haile

(57) ABSTRACT

Novel methods and apparatus regarding electronic eyewear are disclosed. Different embodiments can be applicable for seniors. One embodiment includes an eyewear that can charge when placed in an eyewear case. A user can access a live operator by tapping a button at the eyewear. The live operator can connect the user to a person. The eyewear can detect falls. In another embodiment, the eyewear with a digital assistant can be voice activated, and can provide assistance via the digital assistant. In yet another embodiment, the eyewear includes a position identifying system to identify a position of the eyewear. In one embodiment, the eyewear could wirelessly interact with a device coupled to an apparatus in the vicinity of the eyewear.

31 Claims, 7 Drawing Sheets

Related U.S. Application Data

(60) Provisional application No. 62/718,597, filed on Aug. 14, 2018, provisional application No. 62/686,174, filed on Jun. 18, 2018, provisional application No. 62/681,292, filed on Jun. 6, 2018, provisional application No. 62/668,762, filed on May 8, 2018, provisional application No. 62/656,621, filed on Apr. 12, 2018.

(51) Int. Cl.
*G02C 11/00* (2006.01)
*H04W 4/029* (2018.01)
*G06F 3/16* (2006.01)
*G08B 25/01* (2006.01)

(52) U.S. Cl.
CPC ........ *G08B 21/0446* (2013.01); *H04W 4/029* (2018.02); *G08B 25/016* (2013.01)

(56) References Cited

U.S. PATENT DOCUMENTS

| | | |
|---|---|---|
| 1,255,265 A | 2/1918 | Zachara |
| 1,917,745 A | 7/1933 | Weiss |
| 2,249,572 A | 7/1941 | Lieber |
| 2,638,532 A | 5/1953 | Brady |
| 2,725,462 A | 11/1955 | Vorgang |
| 2,794,085 A | 5/1957 | Angelis |
| 2,818,511 A | 12/1957 | Ullery et al. |
| 2,830,132 A | 7/1958 | Borg |
| 2,874,230 A | 2/1959 | Carlson |
| 2,904,670 A | 9/1959 | Calmes |
| 3,060,308 A | 10/1962 | Fortuna |
| 3,104,290 A | 9/1963 | Rosemond et al. |
| 3,119,903 A | 1/1964 | Rosemond et al. |
| 3,597,054 A | 8/1971 | Winter |
| 3,710,115 A | 1/1973 | Jubb |
| 3,858,001 A | 12/1974 | Bonne |
| 3,883,701 A | 5/1975 | Delorenzo |
| 4,165,487 A | 8/1979 | Corderman |
| 4,254,451 A | 3/1981 | Cochran, Jr. |
| 4,283,127 A | 8/1981 | Rosenwinkel et al. |
| 4,322,585 A | 3/1982 | Liautaud |
| 4,348,664 A | 9/1982 | Boschetti et al. |
| 4,389,217 A | 6/1983 | Baughman et al. |
| 4,526,473 A | 7/1985 | Zahn, III |
| 4,535,244 A | 8/1985 | Burnham |
| 4,608,492 A | 8/1986 | Burnham |
| 4,683,587 A | 7/1987 | Silverman |
| 4,751,691 A | 6/1988 | Perera |
| 4,757,714 A | 7/1988 | Purdy et al. |
| 4,773,095 A | 9/1988 | Zwicker et al. |
| 4,806,011 A | 2/1989 | Bettinger |
| 4,822,160 A | 4/1989 | Tsai |
| 4,822,161 A | 4/1989 | Jimmy |
| 4,851,686 A | 7/1989 | Pearson |
| 4,856,086 A | 8/1989 | McCullough |
| 4,859,047 A | 8/1989 | Badewitz |
| 4,882,769 A | 11/1989 | Gallimore |
| 4,904,078 A | 2/1990 | Gorike |
| 4,942,629 A | 7/1990 | Stadlmann |
| 4,962,469 A | 10/1990 | Ono et al. |
| 4,967,268 A | 10/1990 | Lipton et al. |
| 4,985,632 A | 1/1991 | Bianco et al. |
| 5,008,548 A | 4/1991 | Gat |
| 5,015,086 A | 5/1991 | Okaue et al. |
| 5,020,150 A | 5/1991 | Shannon |
| 5,026,151 A | 6/1991 | Waltuck et al. |
| 5,036,311 A | 7/1991 | Moran et al. |
| 5,050,150 A | 9/1991 | Ikeda |
| 5,064,410 A | 11/1991 | Frenkel et al. |
| 5,093,576 A | 3/1992 | Edmond et al. |
| 5,106,179 A | 4/1992 | Kamaya et al. |
| 5,144,344 A | 9/1992 | Takahashi et al. |
| 5,148,023 A | 9/1992 | Hayashi et al. |
| 5,151,600 A | 9/1992 | Black |
| 5,161,250 A | 11/1992 | Ianna et al. |
| 5,172,256 A | 12/1992 | Sethofer et al. |
| 5,264,877 A | 11/1993 | Hussey |
| 5,306,917 A | 4/1994 | Black et al. |
| 5,353,378 A | 10/1994 | Hoffman et al. |
| 5,359,370 A | 10/1994 | Mugnier |
| 5,359,444 A | 10/1994 | Piosenka et al. |
| 5,367,345 A | 11/1994 | da Silva |
| 5,379,464 A | 1/1995 | Schleger et al. |
| 5,382,986 A | 1/1995 | Black et al. |
| 5,394,005 A | 2/1995 | Brown et al. |
| 5,452,026 A | 9/1995 | Marcy, III |
| 5,452,480 A | 9/1995 | Ryden |
| 5,455,637 A | 10/1995 | Kallman et al. |
| 5,455,640 A | 10/1995 | Gertsikov |
| 5,457,751 A | 10/1995 | Such |
| 5,463,428 A | 10/1995 | Lipton et al. |
| 5,475,798 A | 12/1995 | Handles |
| 5,500,532 A | 3/1996 | Kozicki |
| D369,167 S | 4/1996 | Hanson et al. |
| 5,510,961 A | 4/1996 | Peng |
| 5,513,384 A | 4/1996 | Brennan et al. |
| 5,519,781 A | 5/1996 | Kurkurudza |
| 5,533,130 A | 7/1996 | Staton |
| 5,541,641 A | 7/1996 | Shimada |
| 5,581,090 A | 12/1996 | Goudjil |
| 5,585,871 A | 12/1996 | Linden |
| 5,589,398 A | 12/1996 | Krause et al. |
| 5,590,417 A | 12/1996 | Rydbeck |
| 5,606,743 A | 2/1997 | Vogt et al. |
| 5,608,808 A | 3/1997 | da Silva |
| 5,634,201 A | 5/1997 | Mooring |
| 5,671,035 A | 9/1997 | Barnes |
| 5,686,727 A | 11/1997 | Reenstra et al. |
| 5,694,475 A | 12/1997 | Boyden |
| 5,715,323 A | 2/1998 | Walker |
| 5,737,436 A | 4/1998 | Boyden et al. |
| 5,777,715 A | 7/1998 | Kruegle et al. |
| 5,818,381 A | 10/1998 | Williams |
| 5,819,183 A | 10/1998 | Voroba et al. |
| 5,835,185 A | 11/1998 | Kallman et al. |
| 5,900,720 A | 5/1999 | Kallman et al. |
| 5,903,395 A | 5/1999 | Rallison et al. |
| 5,923,398 A | 7/1999 | Goldman |
| 5,941,837 A | 8/1999 | Amano et al. |
| 5,946,071 A | 8/1999 | Feldman |
| 5,949,516 A | 9/1999 | McCurdy |
| 5,966,746 A | 10/1999 | Reedy et al. |
| 5,980,037 A | 11/1999 | Conway |
| 5,988,812 A | 11/1999 | Wingate |
| 5,991,085 A | 11/1999 | Rallison et al. |
| 5,992,996 A | 11/1999 | Sawyer |
| 5,995,592 A | 11/1999 | Shirai et al. |
| 6,010,216 A | 1/2000 | Jesiek |
| 6,013,919 A | 1/2000 | Schneider et al. |
| 6,028,627 A | 2/2000 | Helmsderfer |
| 6,046,455 A | 4/2000 | Ribi et al. |
| 6,060,321 A | 5/2000 | Hovorka |
| 6,061,580 A | 5/2000 | Altschul et al. |
| 6,091,546 A | 7/2000 | Spitzer |
| 6,091,832 A | 7/2000 | Shurman et al. |
| 6,115,177 A | 9/2000 | Vossler |
| 6,132,681 A | 10/2000 | Faran et al. |
| 6,145,983 A | 11/2000 | Schiffer |
| 6,154,552 A | 11/2000 | Koroljow et al. |
| 6,176,576 B1 | 1/2001 | Green et al. |
| 6,225,897 B1 | 5/2001 | Doyle et al. |
| 6,231,181 B1 | 5/2001 | Swab |
| 6,236,969 B1 | 5/2001 | Ruppert et al. |
| 6,243,578 B1 | 6/2001 | Koike |
| 6,259,367 B1 | 7/2001 | Klein |
| 6,270,466 B1 | 8/2001 | Weinstein et al. |
| 6,292,213 B1 | 9/2001 | Jones |
| 6,292,685 B1 | 9/2001 | Pompei |
| 6,301,050 B1 | 10/2001 | DeLeon |
| 6,301,367 B1 | 10/2001 | Boyden et al. |
| 6,307,526 B1 | 10/2001 | Mann |
| 6,311,155 B1 | 10/2001 | Vaudrey et al. |

(56) References Cited

U.S. PATENT DOCUMENTS

| | | |
|---|---|---|
| 6,343,858 B1 | 2/2002 | Zelman |
| 6,346,929 B1 | 2/2002 | Fukushima et al. |
| 6,349,001 B1 | 2/2002 | Spitzer |
| 6,349,422 B1 | 2/2002 | Schleger et al. |
| 6,409,335 B1 | 6/2002 | Lipawsky |
| 6,409,338 B1 | 6/2002 | Jewell |
| 6,426,719 B1 | 7/2002 | Nagareda et al. |
| 6,431,705 B1 | 8/2002 | Linden |
| 6,474,816 B2 | 11/2002 | Butler et al. |
| 6,478,736 B1 | 11/2002 | Mault |
| 6,506,142 B2 | 1/2003 | Itoh et al. |
| 6,511,175 B2 | 1/2003 | Hay et al. |
| 6,513,532 B2 | 2/2003 | Mault et al. |
| 6,517,203 B1 | 2/2003 | Blum et al. |
| 6,539,336 B1 | 3/2003 | Vock et al. |
| 6,542,081 B2 | 4/2003 | Torch |
| 6,546,101 B1 | 4/2003 | Murray et al. |
| 6,554,763 B1 | 4/2003 | Amano et al. |
| 6,582,075 B1 | 6/2003 | Swab et al. |
| 6,619,799 B1 | 9/2003 | Blum et al. |
| 6,629,076 B1 | 9/2003 | Haken |
| 6,678,381 B1 | 1/2004 | Manabe |
| 6,717,737 B1 | 4/2004 | Haglund |
| 6,729,726 B2 | 5/2004 | Miller et al. |
| 6,736,759 B1 | 5/2004 | Stubbs et al. |
| 6,764,194 B1 | 7/2004 | Cooper |
| 6,769,767 B2 | 8/2004 | Swab et al. |
| 6,771,423 B2 | 8/2004 | Geist |
| 6,788,309 B1 | 9/2004 | Swan et al. |
| 6,792,401 B1 | 9/2004 | Nigro et al. |
| 6,816,314 B2 | 11/2004 | Shimizu et al. |
| 6,824,265 B1 | 11/2004 | Harper |
| 6,857,741 B2 | 2/2005 | Blum et al. |
| 6,871,951 B2 | 3/2005 | Blum et al. |
| 6,879,930 B2 | 4/2005 | Sinclair et al. |
| 6,912,386 B1 | 6/2005 | Himberg et al. |
| 6,929,365 B2 | 8/2005 | Swab et al. |
| 6,932,090 B1 | 8/2005 | Reschke et al. |
| 6,947,219 B1 | 9/2005 | Ou |
| 7,004,582 B2 | 2/2006 | Jannard et al. |
| 7,013,009 B2 | 3/2006 | Warren |
| 7,023,594 B2 | 4/2006 | Blum et al. |
| 7,030,902 B2 | 4/2006 | Jacobs |
| 7,031,667 B2 | 4/2006 | Horiguchi |
| 7,033,025 B2 | 4/2006 | Winterbotham |
| 7,059,717 B2 | 6/2006 | Bloch |
| 7,073,905 B2 | 7/2006 | Da Pra' |
| 7,079,876 B2 | 7/2006 | Levy |
| 7,123,215 B2 | 10/2006 | Nakada |
| 7,192,136 B2 | 3/2007 | Howell et al. |
| 7,255,437 B2 | 8/2007 | Howell et al. |
| 7,265,358 B2 | 9/2007 | Fontaine |
| 7,274,292 B2 | 9/2007 | Velhal et al. |
| 7,289,767 B2 | 10/2007 | Lai |
| 7,312,699 B2 | 12/2007 | Chornenky |
| 7,331,666 B2 | 2/2008 | Swab et al. |
| 7,376,238 B1 | 5/2008 | Rivas et al. |
| 7,380,936 B2 | 6/2008 | Howell et al. |
| 7,401,918 B2 | 7/2008 | Howell et al. |
| 7,405,801 B2 | 7/2008 | Jacobs |
| 7,429,965 B2 | 9/2008 | Weiner |
| 7,438,409 B2 | 10/2008 | Jordan |
| 7,438,410 B1 | 10/2008 | Howell et al. |
| 7,445,332 B2 | 11/2008 | Jannard et al. |
| 7,481,531 B2 | 1/2009 | Howell et al. |
| 7,500,746 B1 | 3/2009 | Howell et al. |
| 7,500,747 B2 | 3/2009 | Howell et al. |
| 7,512,414 B2 | 3/2009 | Jannard et al. |
| 7,517,083 B2 | 4/2009 | Blum et al. |
| 7,527,374 B2 | 5/2009 | Chou |
| 7,543,934 B2 | 6/2009 | Howell et al. |
| 7,581,833 B2 | 9/2009 | Howell et al. |
| 7,621,634 B2 | 11/2009 | Howell et al. |
| 7,648,236 B1 | 1/2010 | Dobson |
| 7,677,723 B2 | 3/2010 | Howell et al. |
| 7,760,898 B2 * | 7/2010 | Howell ............... H04R 5/0335 381/381 |
| 7,771,046 B2 | 8/2010 | Howell et al. |
| 7,792,552 B2 | 9/2010 | Thomas et al. |
| 7,801,570 B2 | 9/2010 | Cheung et al. |
| 7,806,525 B2 | 10/2010 | Howell et al. |
| 7,922,321 B2 | 4/2011 | Howell et al. |
| 7,976,159 B2 | 7/2011 | Jacobs et al. |
| 8,109,629 B2 | 2/2012 | Howell et al. |
| 8,142,015 B2 | 3/2012 | Paolino |
| 8,174,569 B2 | 5/2012 | Tanijiri et al. |
| 8,337,013 B2 | 12/2012 | Howell et al. |
| 8,430,507 B2 | 4/2013 | Howell et al. |
| 8,434,863 B2 | 5/2013 | Howell et al. |
| 8,465,151 B2 | 6/2013 | Howell et al. |
| 8,485,661 B2 | 7/2013 | Yoo et al. |
| 8,500,271 B2 | 8/2013 | Howell et al. |
| 8,770,742 B2 | 7/2014 | Howell et al. |
| 8,849,185 B2 | 9/2014 | Cheung et al. |
| 8,905,542 B2 | 12/2014 | Howell et al. |
| 9,033,493 B2 | 5/2015 | Howell et al. |
| 9,244,292 B2 | 1/2016 | Swab et al. |
| 9,400,390 B2 | 7/2016 | Osterhout et al. |
| 9,405,135 B2 | 8/2016 | Sweis et al. |
| 9,488,520 B2 | 11/2016 | Howell et al. |
| 9,547,184 B2 | 1/2017 | Howell et al. |
| 9,690,121 B2 | 6/2017 | Howell et al. |
| 9,922,236 B2 * | 3/2018 | Moore ................... G06F 3/005 |
| 10,042,186 B2 | 8/2018 | Chao et al. |
| 10,060,790 B2 | 8/2018 | Howell et al. |
| 10,061,144 B2 | 8/2018 | Howell et al. |
| 10,310,296 B2 | 6/2019 | Howell et al. |
| 10,345,625 B2 | 7/2019 | Howell et al. |
| 10,359,311 B2 | 7/2019 | Howell et al. |
| 10,359,459 B1 | 7/2019 | Gorin et al. |
| 10,515,623 B1 | 12/2019 | Grizzel |
| 10,571,715 B2 | 2/2020 | Rizzo, III et al. |
| 10,624,790 B2 | 4/2020 | Chao et al. |
| 10,777,048 B2 | 9/2020 | Howell et al. |
| 10,802,582 B1 | 10/2020 | Clements |
| 10,964,190 B2 * | 3/2021 | Peyrard ............ G08B 21/0446 |
| 11,042,045 B2 | 6/2021 | Chao et al. |
| 11,069,358 B1 | 7/2021 | Harper |
| 11,086,147 B2 | 8/2021 | Howell et al. |
| 11,204,512 B2 | 12/2021 | Howell et al. |
| 11,243,416 B2 | 2/2022 | Howell et al. |
| 11,326,941 B2 | 5/2022 | Howell et al. |
| 11,513,371 B2 | 11/2022 | Howell et al. |
| 11,536,988 B2 | 12/2022 | Howell et al. |
| 11,630,331 B2 | 4/2023 | Howell et al. |
| 11,644,361 B2 | 5/2023 | Howell et al. |
| 11,644,693 B2 | 5/2023 | Howell et al. |
| 2001/0005230 A1 | 6/2001 | Ishikawa |
| 2001/0028309 A1 | 10/2001 | Torch |
| 2001/0050754 A1 | 12/2001 | Hay et al. |
| 2002/0017997 A1 | 2/2002 | Felkowitz |
| 2002/0021407 A1 | 2/2002 | Elliott |
| 2002/0081982 A1 | 6/2002 | Schwartz et al. |
| 2002/0084990 A1 | 7/2002 | Peterson, III |
| 2002/0089639 A1 | 7/2002 | Starner et al. |
| 2002/0090103 A1 | 7/2002 | Calisto, Jr. |
| 2002/0098877 A1 | 7/2002 | Glezerman |
| 2002/0101568 A1 | 8/2002 | Eberl et al. |
| 2002/0109600 A1 | 8/2002 | Mault et al. |
| 2002/0136414 A1 | 9/2002 | Jordan et al. |
| 2002/0140899 A1 | 10/2002 | Blum et al. |
| 2002/0159023 A1 | 10/2002 | Swab |
| 2002/0197961 A1 | 12/2002 | Warren |
| 2003/0018274 A1 | 1/2003 | Takahashi et al. |
| 2003/0022690 A1 | 1/2003 | Beyda et al. |
| 2003/0032449 A1 | 2/2003 | Giobbi |
| 2003/0062046 A1 | 4/2003 | Wiesmann et al. |
| 2003/0064746 A1 | 4/2003 | Rader et al. |
| 2003/0065257 A1 | 4/2003 | Mault et al. |
| 2003/0067585 A1 | 4/2003 | Miller et al. |
| 2003/0068057 A1 | 4/2003 | Miller et al. |
| 2003/0083591 A1 | 5/2003 | Edwards et al. |
| 2003/0091200 A1 | 5/2003 | Pompei |
| 2003/0214630 A1 | 11/2003 | Winterbotham |

(56) References Cited

U.S. PATENT DOCUMENTS

| | | |
|---|---|---|
| 2003/0226978 A1 | 12/2003 | Ribi et al. |
| 2003/0231293 A1 | 12/2003 | Blum et al. |
| 2004/0000733 A1 | 1/2004 | Swab et al. |
| 2004/0005069 A1 | 1/2004 | Buck |
| 2004/0029582 A1 | 2/2004 | Swab et al. |
| 2004/0059212 A1 | 3/2004 | Abreu |
| 2004/0063378 A1 | 4/2004 | Nelson |
| 2004/0096078 A1 | 5/2004 | Lin |
| 2004/0100384 A1 | 5/2004 | Chen et al. |
| 2004/0101178 A1 | 5/2004 | Fedorovskaya et al. |
| 2004/0104864 A1 | 6/2004 | Nakada |
| 2004/0114770 A1 | 6/2004 | Pompei |
| 2004/0128737 A1 | 7/2004 | Gesten |
| 2004/0150986 A1 | 8/2004 | Chang |
| 2004/0156012 A1 | 8/2004 | Jannard et al. |
| 2004/0157649 A1 | 8/2004 | Jannard et al. |
| 2004/0160571 A1 | 8/2004 | Jannard |
| 2004/0160572 A1 | 8/2004 | Jannard |
| 2004/0160573 A1 | 8/2004 | Jannard et al. |
| 2004/0197002 A1 | 10/2004 | Atsumi et al. |
| 2004/0227219 A1 | 11/2004 | Su |
| 2005/0036103 A1 | 2/2005 | Bloch |
| 2005/0067580 A1 | 3/2005 | Fontaine |
| 2005/0078274 A1 | 4/2005 | Howell et al. |
| 2005/0088365 A1 | 4/2005 | Yamazaki et al. |
| 2005/0201585 A1 | 9/2005 | Jannard et al. |
| 2005/0213026 A1 | 9/2005 | Da Pra' |
| 2005/0230596 A1 | 10/2005 | Howell et al. |
| 2005/0238194 A1 | 10/2005 | Chornenky |
| 2005/0239502 A1 | 10/2005 | Swab et al. |
| 2005/0248717 A1 | 11/2005 | Howell et al. |
| 2005/0248718 A1 | 11/2005 | Howell et al. |
| 2005/0248719 A1 | 11/2005 | Howell et al. |
| 2005/0264752 A1 | 12/2005 | Howell et al. |
| 2005/0278446 A1 | 12/2005 | Bryant |
| 2006/0001827 A1 | 1/2006 | Howell et al. |
| 2006/0003803 A1 | 1/2006 | Thomas et al. |
| 2006/0023158 A1 | 2/2006 | Howell et al. |
| 2006/0034478 A1 | 2/2006 | Davenport |
| 2006/0107822 A1 | 5/2006 | Bowen |
| 2006/0132382 A1 | 6/2006 | Jannard |
| 2006/0291667 A1 | 12/2006 | Watanabe et al. |
| 2007/0030442 A1 | 2/2007 | Howell et al. |
| 2007/0035830 A1 | 2/2007 | Matveev et al. |
| 2007/0046887 A1 | 3/2007 | Howell et al. |
| 2007/0055888 A1 | 3/2007 | Miller et al. |
| 2007/0098192 A1 | 5/2007 | Sipkema |
| 2007/0109491 A1 | 5/2007 | Howell et al. |
| 2007/0186330 A1 | 8/2007 | Howell et al. |
| 2007/0189548 A1 | 8/2007 | Croft, III |
| 2007/0200927 A1 | 8/2007 | Krenik |
| 2007/0208531 A1 | 9/2007 | Darley et al. |
| 2007/0211574 A1 | 9/2007 | Croft, III |
| 2007/0248238 A1 | 10/2007 | Abreu et al. |
| 2007/0270663 A1 | 11/2007 | Ng et al. |
| 2007/0271065 A1 | 11/2007 | Gupta et al. |
| 2007/0271116 A1 | 11/2007 | Wysocki et al. |
| 2007/0271387 A1 | 11/2007 | Lydon et al. |
| 2007/0279584 A1 | 12/2007 | Howell et al. |
| 2008/0062338 A1 | 3/2008 | Herzog et al. |
| 2008/0068559 A1 | 3/2008 | Howell et al. |
| 2008/0089545 A1 | 4/2008 | Jannard et al. |
| 2008/0100792 A1 | 5/2008 | Blum et al. |
| 2008/0144854 A1 | 6/2008 | Abreu |
| 2008/0151175 A1 | 6/2008 | Gross |
| 2008/0151179 A1 | 6/2008 | Howell et al. |
| 2008/0158506 A1 | 7/2008 | Fuziak |
| 2008/0211921 A1 | 9/2008 | Sako et al. |
| 2008/0218684 A1 | 9/2008 | Howell et al. |
| 2008/0262392 A1 | 10/2008 | Ananny et al. |
| 2008/0278678 A1 | 11/2008 | Howell et al. |
| 2009/0059159 A1 | 3/2009 | Howell et al. |
| 2009/0059381 A1 | 3/2009 | Jannard |
| 2009/0073375 A1 | 3/2009 | Nakada |
| 2009/0141233 A1 | 6/2009 | Howell et al. |
| 2009/0147215 A1 | 6/2009 | Howell et al. |
| 2009/0156128 A1 | 6/2009 | Franson et al. |
| 2009/0251660 A1 | 10/2009 | Figler et al. |
| 2009/0251661 A1 | 10/2009 | Fuziak, Jr. |
| 2009/0296044 A1 | 12/2009 | Howell et al. |
| 2010/0045928 A1 | 2/2010 | Levy |
| 2010/0061579 A1 | 3/2010 | Rickards et al. |
| 2010/0079356 A1 | 4/2010 | Hoellwarth |
| 2010/0105445 A1 | 4/2010 | Brunton et al. |
| 2010/0110368 A1 | 5/2010 | Chaum |
| 2010/0245754 A1 | 9/2010 | Matsumoto et al. |
| 2010/0296045 A1 | 11/2010 | Agnoli et al. |
| 2010/0309426 A1 | 12/2010 | Howell et al. |
| 2011/0102734 A1 | 5/2011 | Howell et al. |
| 2011/0164122 A1 | 7/2011 | Hardacker |
| 2011/0187990 A1 | 8/2011 | Howell et al. |
| 2011/0241976 A1 | 10/2011 | Boger et al. |
| 2011/0273365 A1 | 11/2011 | West et al. |
| 2011/0292333 A1 | 12/2011 | Kozaki et al. |
| 2012/0033061 A1 | 2/2012 | Ko et al. |
| 2012/0050668 A1 | 3/2012 | Howell et al. |
| 2012/0062357 A1* | 3/2012 | Slamka ............... G09B 21/006 340/4.11 |
| 2012/0101411 A1* | 4/2012 | Hausdorff ............ A61B 5/1117 600/595 |
| 2012/0133885 A1 | 5/2012 | Howell et al. |
| 2012/0176580 A1 | 7/2012 | Sonsino |
| 2012/0283894 A1 | 11/2012 | Naboulsi |
| 2013/0072828 A1 | 3/2013 | Sweis et al. |
| 2013/0077175 A1 | 3/2013 | Hotta et al. |
| 2013/0143519 A1 | 6/2013 | Doezema |
| 2013/0172691 A1* | 7/2013 | Tran ..................... A61B 5/0022 600/595 |
| 2013/0201440 A1 | 8/2013 | Howell et al. |
| 2013/0308089 A1 | 11/2013 | Howell et al. |
| 2014/0132913 A1 | 5/2014 | Sweis et al. |
| 2014/0176902 A1 | 6/2014 | Sweis et al. |
| 2014/0198293 A1 | 7/2014 | Sweis et al. |
| 2014/0226838 A1* | 8/2014 | Wingate .............. G10L 21/0272 381/111 |
| 2014/0268008 A1 | 9/2014 | Howell et al. |
| 2014/0268013 A1 | 9/2014 | Howell et al. |
| 2014/0268017 A1 | 9/2014 | Sweis et al. |
| 2014/0361185 A1 | 12/2014 | Howell et al. |
| 2015/0085245 A1 | 3/2015 | Howell et al. |
| 2015/0230988 A1 | 8/2015 | Chao et al. |
| 2015/0253590 A1 | 9/2015 | Howell et al. |
| 2015/0277123 A1* | 10/2015 | Chaum ................ G02B 27/017 348/62 |
| 2015/0338677 A1* | 11/2015 | Block ................... G02C 5/006 351/63 |
| 2016/0098874 A1 | 4/2016 | Handville et al. |
| 2016/0246075 A9 | 8/2016 | Howell et al. |
| 2016/0302992 A1 | 10/2016 | Sweis et al. |
| 2017/0068117 A9 | 3/2017 | Howell et al. |
| 2017/0074721 A1 | 3/2017 | Howell et al. |
| 2017/0090219 A1 | 3/2017 | Howell et al. |
| 2017/0131575 A1 | 5/2017 | Howell et al. |
| 2017/0146829 A1 | 5/2017 | Howell et al. |
| 2017/0303187 A1 | 10/2017 | Crouthamel et al. |
| 2018/0122208 A1* | 5/2018 | Peyrard ................ G06F 3/013 |
| 2018/0314079 A1 | 11/2018 | Chao et al. |
| 2018/0335650 A1 | 11/2018 | Howell et al. |
| 2018/0348050 A1 | 12/2018 | Howell et al. |
| 2019/0004325 A1 | 1/2019 | Connor |
| 2019/0033622 A1* | 1/2019 | Olgun .................. H02J 50/10 |
| 2019/0033623 A1 | 1/2019 | Howell et al. |
| 2019/0187492 A1 | 6/2019 | Howell et al. |
| 2019/0272800 A1 | 9/2019 | Tao et al. |
| 2019/0278110 A1 | 9/2019 | Howell et al. |
| 2019/0285913 A1 | 9/2019 | Howell et al. |
| 2019/0310132 A1 | 10/2019 | Howell et al. |
| 2019/0318589 A1 | 10/2019 | Howell et al. |
| 2019/0369402 A1* | 12/2019 | Woodman ........... H04N 5/2254 |
| 2019/0378493 A1 | 12/2019 | Kim et al. |
| 2019/0387351 A1 | 12/2019 | Lyren et al. |
| 2020/0012127 A1 | 1/2020 | Howell et al. |
| 2020/0218094 A1 | 7/2020 | Howell et al. |
| 2021/0000347 A1 | 1/2021 | Stump |

(56) References Cited

U.S. PATENT DOCUMENTS

| | | |
|---|---|---|
| 2021/0026146 A1 | 1/2021 | Harder et al. |
| 2021/0271116 A1 | 9/2021 | Chao et al. |
| 2021/0364827 A9 | 11/2021 | Howell et al. |
| 2021/0364828 A1 | 11/2021 | Howell et al. |
| 2021/0379425 A1 | 12/2021 | Tran |
| 2022/0008763 A1 | 1/2022 | Saleh et al. |
| 2022/0011603 A1 | 1/2022 | Howell et al. |
| 2022/0034542 A1 | 2/2022 | Peters et al. |
| 2022/0054092 A1 | 2/2022 | Howell et al. |
| 2022/0178743 A1 | 6/2022 | Howell et al. |
| 2022/0335792 A1 | 10/2022 | Howell et al. |
| 2022/0415388 A1 | 12/2022 | Howell et al. |
| 2023/0017634 A1 | 1/2023 | Howell et al. |
| 2023/0033660 A1 | 2/2023 | Howell et al. |
| 2023/0057654 A1 | 2/2023 | Howell et al. |

FOREIGN PATENT DOCUMENTS

| | | |
|---|---|---|
| CN | 89214222.7 | 3/1990 |
| CN | 90208199.3 | 11/1990 |
| DE | 10123226 A1 | 11/2002 |
| EP | 1134491 A2 | 9/2001 |
| EP | 1027626 B1 | 3/2023 |
| EP | 2290433 B1 | 4/2023 |
| FR | 2530039 A1 | 1/1984 |
| GB | 1467982 | 3/1977 |
| JP | 58-113912 | 7/1983 |
| JP | 58-113914 | 7/1983 |
| JP | 02-181722 | 7/1990 |
| JP | 09-017204 | 1/1997 |
| JP | 10-161072 | 6/1998 |
| JP | 2000-039595 | 2/2000 |
| JP | 2002-02511706 A | 4/2002 |
| JP | 2002 341059 A | 11/2002 |
| JP | 2005-151292 | 6/2005 |
| JP | 2005-167902 | 6/2005 |
| KR | 2002-0044416 A | 6/2002 |
| TW | 484711 | 6/2001 |
| WO | WO 1997/12205 A1 | 4/1997 |
| WO | WO 99/50706 A1 | 10/1999 |
| WO | WO 2001/06298 A1 | 1/2001 |
| WO | WO 2001/24576 A1 | 4/2001 |
| WO | WO 2002/06881 A2 | 1/2002 |
| WO | WO 2003/069394 A1 | 8/2003 |
| WO | WO 2003/100368 A1 | 12/2003 |
| WO | WO 2003/100503 A2 | 12/2003 |
| WO | WO 2004/012477 A2 | 2/2004 |
| WO | WO 2004/025554 A1 | 3/2004 |
| WO | WO 10/0141514 A2 | 12/2010 |

OTHER PUBLICATIONS

Office Action for U.S. Appl. No. 14/072,784, dated Jul. 27, 2015.
Office Action for U.S. Appl. No. 14/072,784, dated Oct. 29, 2015.
Notice of Allowance for U.S. Appl. No. 14/072,784, dated Jan. 14, 2016.
Notice of Allowance for U.S. Appl. No. 14/072,784, dated Apr. 7, 2016.
Office Action for U.S. Appl. No. 15/193,155, dated Sep. 26, 2016.
Office Action for U.S. Appl. No. 15/193,155, dated Jun. 8, 2017.
Office Action for U.S. Appl. No. 14/190,352, dated Oct. 26, 2016.
Office Action for U.S. Appl. No. 14/190,352, dated May 4, 2017.
Office Action for U.S. Appl. No. 14/703,875, dated Oct. 5, 2016.
Office Action for U.S. Appl. No. 14/703,875, dated May 17, 2017.
Office Action for U.S. Appl. No. 14/703,875, dated Apr. 2, 2018.
Office Action for U.S. Appl. No. 14/703,875, dated Oct. 2, 2018.
Office Action for U.S. Appl. No. 14/703,875, dated Mar. 15, 2019.
Office Action for U.S. Appl. No. 14/703,875, dated Jul. 26, 2019.
Advisory Action for U.S. Appl. No. 14/703,875, dated Sep. 27, 2019.
Notice of Allowance for U.S. Appl. No. 14/703,875, dated Jan. 13, 2020.
Restriction Requirement for U.S. Appl. No. 14/217,174, dated Mar. 28, 2016.
Office Action for U.S. Appl. No. 14/217,174, dated Jul. 28, 2016.
Office Action for U.S. Appl. No. 14/217,174, dated Feb. 10, 2017.
Restriction Requirement for U.S. Appl. No. 14/211,491, dated Jul. 16, 2015.
Office Action for U.S. Appl. No. 14/211,491, dated Oct. 19, 2015.
Office Action for U.S. Appl. No. 14/211,491, dated Feb. 23, 2016.
Notice of Allowance for U.S. Appl. No. 14/211,491, dated Nov. 9, 2016.
Notice of Allowance for U.S. Appl. No. 14/211,491, dated May 26, 2017.
Office Action for U.S. Appl. No. 14/211,491, dated Oct. 11, 2017.
Notice of Allowance for U.S. Appl. No. 14/211,491, dated Apr. 9, 2018.
Restriction Requirement for U.S. Appl. No. 16/031,046, dated Feb. 11, 2019.
Office Action for U.S. Appl. No. 16/031,046, dated Apr. 16, 2019.
Office Action for U.S. Appl. No. 16/031,046, dated Jul. 1, 2019.
Office Action for U.S. Appl. No. 16/031,046, dated Sep. 10, 2019.
Notice of Allowance for U.S. Appl. No. 16/031,046 dated Jan. 15, 2020.
Notice of Allowance for U.S. Appl. No. 16/031,046 dated Mar. 24, 2020.
Notice of Allowance for U.S. Appl. No. 16/382,036, dated Feb. 24, 2020.
Notice of Allowance for U.S. Appl. No. 16/382,036, dated May 18, 2020.
"±1.5g Dual Axis Micromachined Accelerometer", Freescale Semiconductor, Inc., Motorola Semiconductor Technical Data, MMA6260Q, Jun. 2004, pp. 1-7.
"APA Announces Shipment of the SunUV™ Personal UV Monitor", Press Release, Nov. 7, 2003, pp. 1-3.
"Camera Specs Take Candid Snaps", BBC News, Sep. 18, 2003, pp. 1-3.
"Cardo Wireless Attaching Clips and Wearing Headset", Cardo Systems, Inc., http://www.cardowireless.com/clips.php, downloaded Nov. 27, 2004, pp. 1-3.
"Environmental Health Criteria 14: Ultraviolet Radiation", International Programme on Chemical Safety, World Health Organization Geneva, 1979 http://www.ichem.org., pp. 1-102.
"Exclusive Media Event Marks Debut of Oakley Thump: World's First Digital Audio Eyewear", Oakley Investor Relations, Press Release, Nov. 15, 2004, pp. 1-2.
"Eyetop, Product-Features", eyetop eyewear, eyetop belt worn, http://www.eyetop.net/products/eyetop/features.asp., downloaded Nov. 6, 2003, pp. 1-2.
"Heart Rate Monitors", http://www.healthgoods.com, downloaded Dec. 4, 2004.
"How is the UV Index Calculated", SunWise Program, U.S. Environmental Protection Agency, http://www.epa.gov/sunwise/uvcalc.html, downloaded Oct. 14, 2004, pp. 1-2.
"Industrial UV Measurements", APA Optics, Inc., http://www.apaoptics.com/uv/, downloaded Jul. 12, 2004, p. 1.
"Motorola and Oakley Introduce First Bluetooth Sunglasses—Cutting Edge RAZRWire Line Offers Consumers On-The-Go Connections", Motorola Mediacenter-Press Release, Feb. 14, 2005, pp. 1-2.
"Oakley Thump: Sunglasses Meet MP3 Player", with image, http://news.designtechnica.com/article4665.html, Jul. 13, 2004.
"Personal UV monitor," Optics.org, http://optics.org/articles/news/6/6/7/1 (downloaded Dec. 20, 2003), Jun. 9, 2000, pp. 1-2.
"SafeSun Personal Ultraviolet Light Meter", http://healthchecksystems.com/safesun.htm, downloaded Jul. 12, 2004, pp. 1-4.
"SafeSun Personal UV Meter", Introduction, OptixTech Inc., http://www.safesun.com, downloaded Feb. 5, 2004, pp. 1-2.
SafeSun Personal UV Meter, features, Optix Tech Inc., http://www.safesun.com/features.html, downloaded May 1, 2004, pp. 1-2.
"Sharper Image—The FM Pedometer", e-Corporate Gifts.com, http://www.e-corporategifts.com/sr353.html, downloaded Jan. 22, 2005, pp. 1-2.

(56) References Cited

OTHER PUBLICATIONS

"Sun UV™ Personal UV Monitor", APA Optics, Inc., http://www.apaoptics.com/sunuv/uvfacts.html, downloaded Dec. 20, 2003, pp. 1-3.
"Ultraviolet Light and Sunglasses", Oberon's Frequently Asked Questions, http://www.oberoncompany.com/OBEnglish/FAQUV.html, downloaded Feb. 5, 2004, pp. 1-2.
"Ultraviolet Light Sensor", Barrett & Associates Engineering, http://www.barrettengineering.com/project_uvs.htm, downloaded Feb. 5, 2004, pp. 1-3.
"Ultraviolet Radiation (UVR)", Forum North, Ontario Ministry of Labour, http://www3.mb.sympatico.ca/~ericc/ULTRAVIOLET%20RADIATION.htm, downloaded Feb. 5, 2004, pp. 1-6.
"What Are Grippies?", Gripping Eyewear, Inc., http://www.grippingeyewear.com/whatare.html, downloaded Nov. 2, 2005.
"With Racing Heart", Skaloud et al., GPS World, Oct. 1, 2001, http://www.gpsworld.com/gpsworld/content/printContentPopup.jsp?id=1805, pp. 1-5.
Abrisa Product Information: Cold Mirrors, Abrisa, Jun. 2001, p. 1.
Abrisa Product Information: Commercial Hot Mirror, Abrisa, Jun. 2001, p. 1.
Alps Spectacle, Air Conduction Glass, Bone Conduction Glass, http://www.alps-inter.com/spec.htm, downloaded Dec. 10, 2003, pp. 1-2.
Altimeter and Compass Watches, http://store.yahoo.com/snowshack/altimeter-watches.html, downloaded May 3, 2004, pp. 1-2.
Pediatric Eye Disease Group,"Randomized Trial of Treatment of Amblyopia in Children Aged 7 to 17 Years," Roy W. Beck, M.D., Ph.D. Section Ed., Originally Published and Reprinted from Arch Ophthalmol, v. 123, Apr. 2005, pp. 437-447, http;//archopht.jamanetwork.com/ by a new England College of Optometry User on Dec. 20, 2012.
Bone Conduction Headgear HG16 Series, "Voiceducer," http://www.temco-j.co.jp/html/English/HG16.html, downloaded Dec. 10, 2003, pp. 1-3.
Carney, David, "The Ultimate MP3 Player for Athletes? Could be.", CNET Reviews, May 14, 2004, pp. 1-4.
Clifford, Michelle A., "Accelerometers Jump into the Consumer Goods Market", Sensors Online, http://www.sensorsmag.com, Aug. 2004.
Comfees.com, Adjustable Sports Band Style No. 1243, http://shop.store.yahoo.com/comfees/adsportbansty.html, downloaded Apr. 18, 2003, pp. 1-2.
Cool Last Minute Gift Ideas!, UltimateFatBurner Reviews and Articles, http://www.ultimatefatburner.com/gift-ideas.html, downloaded May 10, 2005, pp. 1-3.
Dickie et al. "Eye Contact Sensing Glasses for Attention-Sensitive Wearable Video Blogging," Human Media Lab, Queen's University, Kingston, ON K7L3N6, Canada, est. Apr. 2004, pp. 1-2.
Dixen, Brian, "ear-catching", Supertesten, Mobil, Apr. 2003 (estimated), pp. 37-41.
Global Solar UV Index, A Practical Guide, World Health Organization, 2002, pp. 1-28.
Grobart, Sam, "Digit-Sizing Your Computer Data", News Article, Sep. 2004, p. 1.
Holmes, JM et al. "A randomized trial of prescribed patching regimens for treatment of severe amblyopia in children." Ophthalmology, v. 110, Iss. 11, Nov. 2003, pp. 2075-2087.
Inductive Charging Set, https://adafruit.com/product/1459/, downloaded Apr. 10, 2019, pp. 1-2.
Life Monitor V1.1, Rhusoft Technologies Inc., http://www.rhusoft.com/lifemonitor/, Mar. 1, 2003, pp. 1-6.
Manes, Stephen, "Xtreme Cam", Forbes Magazine, Sep. 5, 2005, p. 96.
Mio, PhysiCal, http://www.gophysical.com/, downloaded Jan. 27, 2004, 5 pages.
Monitoring Athletes Performance—2002 Winter Olympic News from KSL, Jan. 23, 2002, http://2002.ksl.com/news-3885i, pp. 1-3.
Niwa, "UV Index Information", http://www.niwa.cri.nz/services/uvozone/uvi-info, downloaded Jul. 15, 2004, pp. 1-2.
NuVision 60GX Steroscopic Wireless Glasses, Product Information, NuVision by MacNaughton, c. 1997, MacNaughton, Inc., pp. 1-2.
Pärkkä, Juha, et al., "A Wireless Wellness Monitor for Personal Weight Management", VII Information Technology, Tampere, Finland, Nov. 2000, p. 1.
Pedometer, Model HJ-112, Omron Instruction Manual, Omron Healthcare, Inc., 2003, pp. 1-27.
PNY Announces Executive Attaché USB 2.0 Flash Drive and Pen Series, Press Release, PNY Technologies, Las Vegas, Jan. 8, 2004, pp. 1-2.
PNY Technologies," Executive Attaché" http://www.pny.com/products/flash/execattache.asp downloaded Nov. 16, 2005.
Polar WM41 and 42 weight management monitor, http://www.simplysports/polar/weight management/wm41-42.htm, downloaded Jan. 28, 2004, pp. 1-3.
Questions Answers, Pedometer.com, http://www.pedometer.com, downloaded May 5, 2005.
Radio Frequency Wireless Charging: How RF Charging Works?, ©2010-2015 Humavox Ltd., Nov. 3, 2016, http://www.humavox.com/blog/rf-wireless-charging-works/, d+B638ownloaded Apr. 11, 2019, pp. 1-10.
Razrwire, copyright Motorola, Inc., Jul. 2005, 1 page.
Repka MX et al. "A randomized trial of patching regimens for treatment of moderate amblyopia in children." *Arch Ophthalmology* v. 121, No. 5, May 2003, pp. 603-611.
Roberts, Catherine. "How to Choose a Medical Alert System," © 2006-2016 Consumer Reports, https://www.consumerreports.org/medical-alert-systems/how-to-choose-a-medical-alert-system/, Feb. 7, 2019, downloaded Apr. 10, 2019, pp. 1-22.
SafeSun Personal UV Meter, Scientific Data, Optix Tech Inc., http://www.safesun.com/scientific.html, downloaded May 1, 2004, pp. 1-3.
SafeSun Sensor, User's Manual, Optix Tech Inc., Jun. 1998, 2 pages.
Safesun, Personal UV Meter, "Technical Specifications", Optix Tech Inc., http://www.safesun.com/technical.html, downloaded Jul. 12, 2004, pp. 1-2.
Safesun, Personal UV Meter, Experiments, Optix Tech Inc., http://www.safesun.com/experiments.html, downloaded Feb. 5, 2004, pp. 1-2.
Shades of Fun, Blinking Light Glasses, http://www.shadesoffun.com/Nov/Novpgs-14.html, downloaded Jul. 9, 2005, pp. 1-4.
SportLine Fitness Pedometer-Model 360, UltimateFatBurner Superstore, http://www.ultimatefatburner-store.com/ac_004.html, downloaded May 10, 2005, pp. 1-2.
Steele, Bonnie G et al., "Bodies in motion: Monitoring daily activity and exercise with motion sensors in people with chronic pulmonary disease", VA Research & Development, Journal of Rehabilitation Research & Development, vol. 40, No. 5, Sep./Oct. 2003, Supplement 2, pp. 45-58.
Stevens, Kathy, "Should I Use a Pedometer When I Walk?", Healtheon/WebMD, Apr. 14, 2000.
Sundgot, Jørgen "2nd-gen Motorola Bluetooth headset", InfoSync World, Mar. 1, 2003, http://www.infosync.no/news/2002/n/2841.html, pp. 1-2.
Sunsensors, Segan Industries, Inc., http://www.segan-ind.com/sunsensor.htm, downloaded Feb. 5, 2004, pp. 1-3.
SunUV™, Personal UV Monitor User's Guide, APA Optics, Inc., 2003 pp. 1-52.
SunUV™, Personal UV Monitor, APA Optics, Inc., http://www.apaoptics.com/sunuv/models.html, downloaded Dec. 20, 2003.
Talking Pedometer, Sportline, Inc., Jun. 2001 (Possibly earlier), 1 page.
The unofficial Elsa 3D Revelator p. Dec. 30, 1999, pp. 1-15.
Top Silicon PIN Photodiode, PD93-21C, Technical Data Sheet, Everlight Electronics Co., Ltd., 2004, pp. 1-9.
Universal Qi Wireless Charging Module, https://www.adafruit.com/product/1901/, downloaded Oct. 15, 2015, pp. 1-3.
Universal Qi Wireless Charging Transmitter, https://www.adafruit.com/product/2162/, downloaded Apr. 10, 2019, pp. 1-2.
UV Light Meter, UVA and UVB measurement, UV-340, Instruction Manual, Lutron, Jun. 2003 (estimated), pp. 1-5.

(56) References Cited

OTHER PUBLICATIONS

UV-Smart, UVA/B Monitor, Model EC-960-PW, Instruction Manual, Tanita Corporation of America, Inc., downloaded Nov. 16, 2001.
Vitaminder Personal Carb Counter, http://www.auravita.com/products/AURA/ORBU11420.asp. Downloaded Nov. 15, 2005, pp. 1-4.
Wallace DK et al. "A randomized trial to evaluate 2 hours of daily patching for strabismic and anisometropic amblyopia in children." *Ophthalmology* v. 113, No. 6, Jun. 2006, pp. 904-912.
Wireless Charging for the Smallest Wearables Available, © 2010-2015 Humavox Ltd., Apr. 7, 2016, http://www.humavox.com/blog/wireless-charging-smallest-wearables-available/, downloaded Apr. 11, 2019, pp. 1-7.
Yamada et al. "Development of an eye-movement analyser possessing functions for wireless transmission and autocalibration," Med. Biol. Eng. Comput., No. 28, v.4, Jul. 28, 1990, http://link.springer.com/article/10.1007%2FBF02446149?LI=true, pp. 1-2.
Notice of Allowance for U.S. Appl. No. 16/031,046 dated Apr. 5, 2021.
Office Action for U.S. Appl. No. 17/856,954, dated Aug. 18, 2022.
Office Action for U.S. Appl. No. 17/856,954, dated Oct. 11, 2022.
Office Action for U.S. Appl. No. 17/856,954, dated Jul. 2, 2022.
Office Action for U.S. Appl. No. 17/856,954, dated Dec. 7, 2022.
Office Action for U.S. Appl. No. 17/856,954, dated Apr. 14, 2023.

\* cited by examiner

METHODS AND APPARATUS REGARDING ELECTRONIC EYEWEAR APPLICABLE FOR SENIORS

CROSS REFERENCE TO RELATED APPLICATIONS

This application is a continuation of U.S. patent application Ser. No. 16/382,036, filed on Apr. 11, 2019, now U.S. Pat. No. 10,777,048, entitled "Methods and Apparatus Regarding Electronic Eyewear Applicable for Seniors," which is hereby incorporated herein by reference and which in turn claims benefit of (a) U.S. Provisional Patent Application No. 62/656,621, filed on Apr. 12, 2018, entitled "Electronic Eyewear for Seniors," which is hereby incorporated herein by reference; (b) U.S. Provisional Patent Application No. 62/668,762, filed on May 8, 2018, entitled "Methods and Apparatus regarding Electronic Eyewear Applicable for Seniors," which is hereby incorporated herein by reference; (c) U.S. Provisional Patent Application No. 62/681,292, filed on Jun. 6, 2018, entitled "Methods and Apparatus regarding Electronic Eyewear Applicable for Seniors," which is hereby incorporated herein by reference; (d) U.S. Provisional Patent Application No. 62/686,174, filed Jun. 18, 2018, entitled "Methods and Apparatus Regarding Electronic Eyewear Applicable for Seniors," which is hereby incorporated herein by reference; and (e) U.S. Provisional Patent Application No. 62/718,597, filed on Aug. 14, 2018, entitled "Methods and Apparatus Regarding Electronic Eyewear Applicable for Seniors," which is hereby incorporated herein by reference.

BACKGROUND OF THE INVENTION

As the elderly population continues to grow, technologies for aging will become crucial for ensuring seniors' well-being. Existing devices and services attempt to address some of these needs, but can be unwieldy and conspicuous. It is desirable to have methods and apparatuses combining ease-of-use with compact electronics in items many seniors already use every day that could address the needs of seniors, particularly those who live by themselves.

SUMMARY OF THE INVENTION

Different embodiments focus on using electronic eyewear to address the needs of seniors, particularly those who live by themselves and may need extra help, such as to get around or keep in touch with loved ones.

As the elderly population continues to grow, technologies for aging are becoming more crucial for ensuring seniors' well-being. A number of embodiments combine ease-of-use with compact electronics in an item many seniors already use every day: eyewear.

Different embodiments can benefit elderly users who want to remain independent. The different embodiments empower and guide the elderly through routine obstacles, from maintaining a schedule to addressing critical needs in the event of an emergency.

One embodiment prioritizes a simple learning curve: a waterproof eyewear that can charge automatically when placed in an appropriate eyewear case, and can allow a user to access different features of the eyewear through the eyewear's one-button interface. For example, one tap of the button can summon a digital assistant—available in the user's preferred language—that can place calls to contacts and respond to questions like "Major news today?"; "Have I walked enough today?"; and "How do I get home from here?". If the digital assistant can't help, it can connect the user to a live professional operator. The user can also connect to the operator directly at any time, simply by, for example, tapping the button more than once. The operator can offer more personalized assistance, including responding to more complicated requests, or connecting the user to the right person for the situation, such as a loved one or emergency services.

Another embodiment includes features for the user who can benefit from additional assistance and monitoring. The eyewear can detect falls, and can continually measure the user's key vital signs. In the event of a problem, the eyewear can send a caregiver to check on the user. In different embodiments, the eyewear can also provide convenient reminders for eating, taking medications, drinking water, and sleeping.

One embodiment not only can detect falls but can connect the eyewear to a live operator. The eyewear can be charged easily via inductive charging by placing the eyewear in an appropriate eyewear case. In another embodiment, the eyewear can also be voice activated.

One embodiment includes a position identifying system to help guide the user, such as when the user is lost. Many seniors want to keep independent, and sometimes, want to go for a walk. They may forget how to get home. In one embodiment, by pushing a button on the eyewear, a user could be linked to a person who could guide the user home. Or in another embodiment, instead of a person, a digital assistant in the eyewear could help.

In one embodiment, the eyewear could wirelessly interact with a device in an apparatus in its vicinity. For example, the apparatus could be a stove. When the user turns on a burner at the stove, the device could send a signal to the eyewear. And a digital assistant in the eyewear could alert the user if the eyewear has not received from the device another wireless signal regarding the burner being turned off after a preset amount of time.

Different embodiments offer an easy, familiar way for seniors to maintain their independence, facilitating fast and automatic communication, and providing guidance. The different embodiments would enable seniors to retire their worries, not their lifestyles, and offer loved ones the sound tranquility of relief.

Other aspects and advantages of the present invention will become apparent from the following detailed description, which, when taken in conjunction with the accompanying drawings, illustrates by way of example the principles of the invention.

Figure 1:
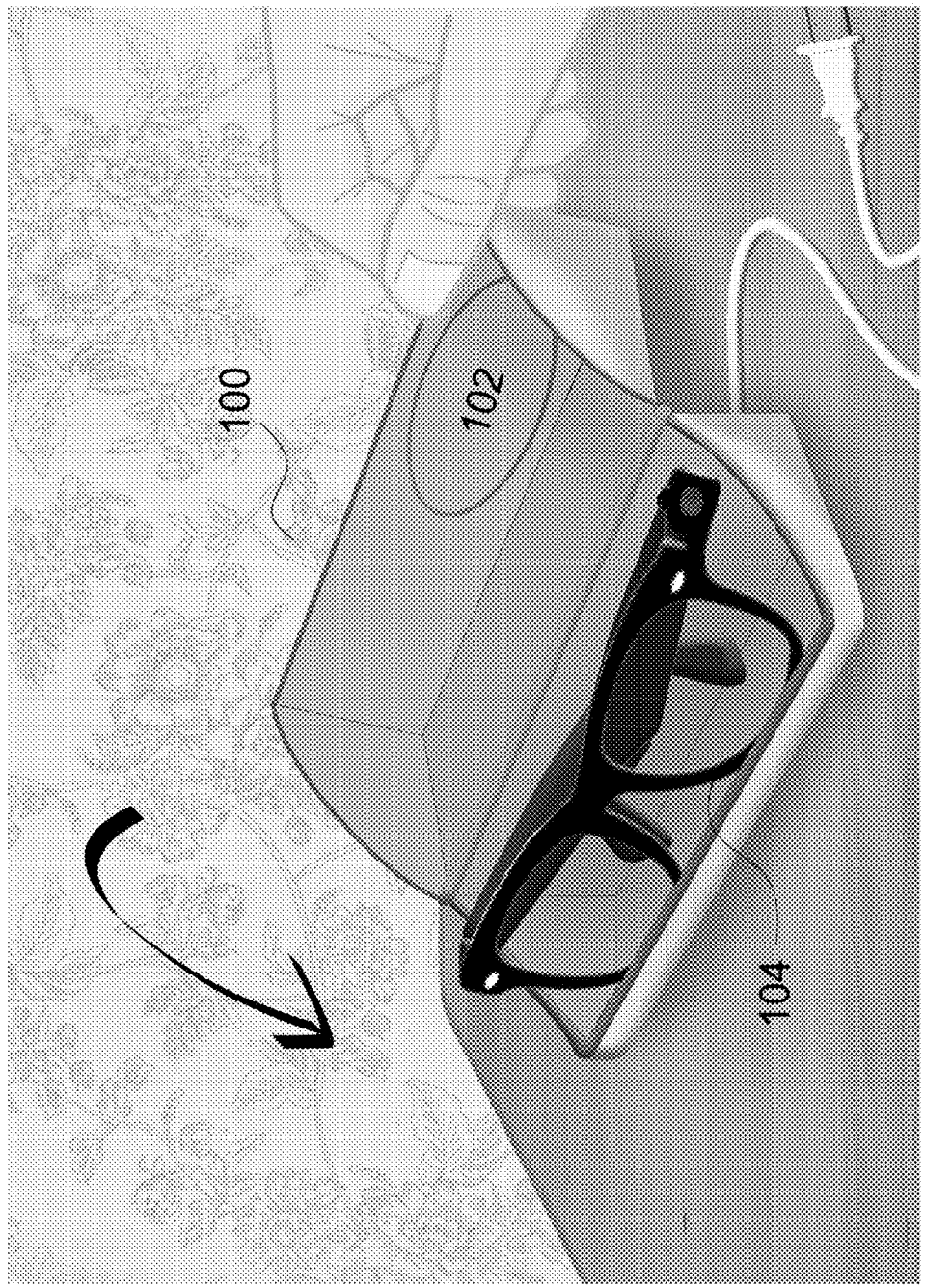
FIG. 1 shows an embodiment of an eyewear in an eyewear casing that could help charge the eyewear.

Same numerals in FIGS. 1-7 are assigned to similar elements in all the figures. Embodiments of the invention are discussed below with reference to FIGS. 1-7. However, those skilled in the art will readily appreciate that the detailed description given herein with respect to these figures is for explanatory purposes as the invention extends beyond these limited embodiments.

DETAILED DESCRIPTION OF THE INVENTION

Different embodiments of electronic eyewear for everyday use are disclosed herein and may be used individually or in any combination. They could be used, for example, by seniors.

One embodiment is equipped with an easily accessible button located, for example, at a side of the eyewear. Pressing the button once enables the user to speak to a digital assistant in her preferred language. The assistant can respond to a number of preset requests, including "How can I get to the library?"; "Louder!"; "Call Katherine for me."; and "Tell me the major news today."

If the user becomes lost, she can ask the digital assistant, "How do I get home?" In response, the assistant can provide real-time step-by-step directions to guide the user home using the eyewear's built-in GPS or other location guidance system.

In one embodiment, for more complex inquiries, the user can simply ask the digital assistant to connect her to a live professional operator. Or, by pressing the button more than once, the user can connect directly to the operator at any time, without going through the digital assistant. The operator can, if necessary, soothe the user, provide more personal help, and answer more complicated questions. The operator can also connect the user to family and friends, caregivers, or emergency services, as the particular situation requires.

In one embodiment, when the eyewear needs to be recharged, the user can place the eyewear in its case, which functions as an automatic charging station without any extra effort from the user. The next day, the glasses can be fully charged for use. It can be that easy!

One embodiment can detect falls. For example, if the user falls while walking and is then practically motionless, the eyewear could ask if the user is okay or directly alert a caregiver. It also can measure the user's other vital signs, such as body temperature, heart rate, and blood oxygen level. The eyewear can automatically connect to emergency services if monitored data surpasses predetermined safety thresholds. The eyewear can be waterproof, so it can continue to function even when it gets wet, like on a rainy day.

In one embodiment, the eyewear can add features for seniors who would benefit from additional assistance and monitoring. The eyewear can provide convenient reminders for eating, taking medications, drinking water, and sleeping. Motion sensors can be built into the eyewear to detect whether the user has remained stationary for too long. A digital assistant in the eyewear can encourage the sedentary user to stand, walk a few steps, or stroll outside. In one embodiment, the eyewear can light up the user's path to facilitate night activity.

In one embodiment, the eyewear can include a being-worn sensor, which could sense if the eyewear is worn. The eyewear can be automatically activated or turned on when the eyewear is worn. For example, when a user gets up in the morning and puts on the eyewear, the eyewear could be turned on automatically. Different embodiments of a being-worn sensor in an eyewear are described in U.S. Pat. No. 8,434,863, entitled, "Eyeglasses with Printed Circuit Board," which is incorporated herein by reference.

In one embodiment, the eyewear could be automatically charged if placed in a charging station. For example, the eyewear could come with a case, which could be connected to a wall power outlet (directly or via a wire/cable). If the eyewear is placed in the case, the eyewear can then be charged. To illustrate, in one embodiment, a user could take off a pair of eyeglasses with folding arms. With the arms folded, the glasses could be turned off. The user could put the glasses into its case, where the eyeglasses could be charged. One charging mechanism can be via a connector at the eyewear being connected to a connector at a case (e.g., an electrical connector, such as a USB connector, accessible inside the case). Different embodiments regarding a charging station for an eyewear are disclosed in "Eyewear Housing for Charging Embedded Battery in Eyewear Frame," with application Ser. No. 15/409,723, which is incorporated herein by reference.

Another charging mechanism can be via inductive coupling. For example, there could be receiving charging coils of wires in the eyewear, such as inside the frame of the eyewear. To illustrate, the receiving charging coils could be at a lens holder and/or at one or more arms of a pair of eyeglasses. At corresponding position(s) inside a case where the eyewear could be housed, there could also be transmitting charging coils of wires. Via inductive coupling, a rechargeable battery in the eyewear can be charged via coupling between the receiving charging coils in the frame of the eyewear and the transmitting charging coils in the case. One such structure 100 is shown, for example, in FIG. 1, where there could be receiving charging coils at least around the lens holders of the eyewear. When the eyewear is placed in the case, for example, with the case closed, the eyewear could be charged automatically by transmitting charging coils in the case, such as at the oval-shaped area 102 at a side wall of the case as shown in FIG. 1, which could be arranged to be in close proximity to at least one of the lens holders 104 when the eyeglasses are placed in the case and the case is closed. In one embodiment, the eyewear and the case can be designed so that the eyewear could go into the case in only one way, such as when one wants to close the case. In one embodiment, there could be a switch at the case, such as close to the hinge of the case, so that when the case is closed, the switch could be activated to start the charging process.

Figure 2:
FIG. 2 shows an embodiment of an eyewear in a plate with a slot that could help charge the eyewear.
Figure 3:
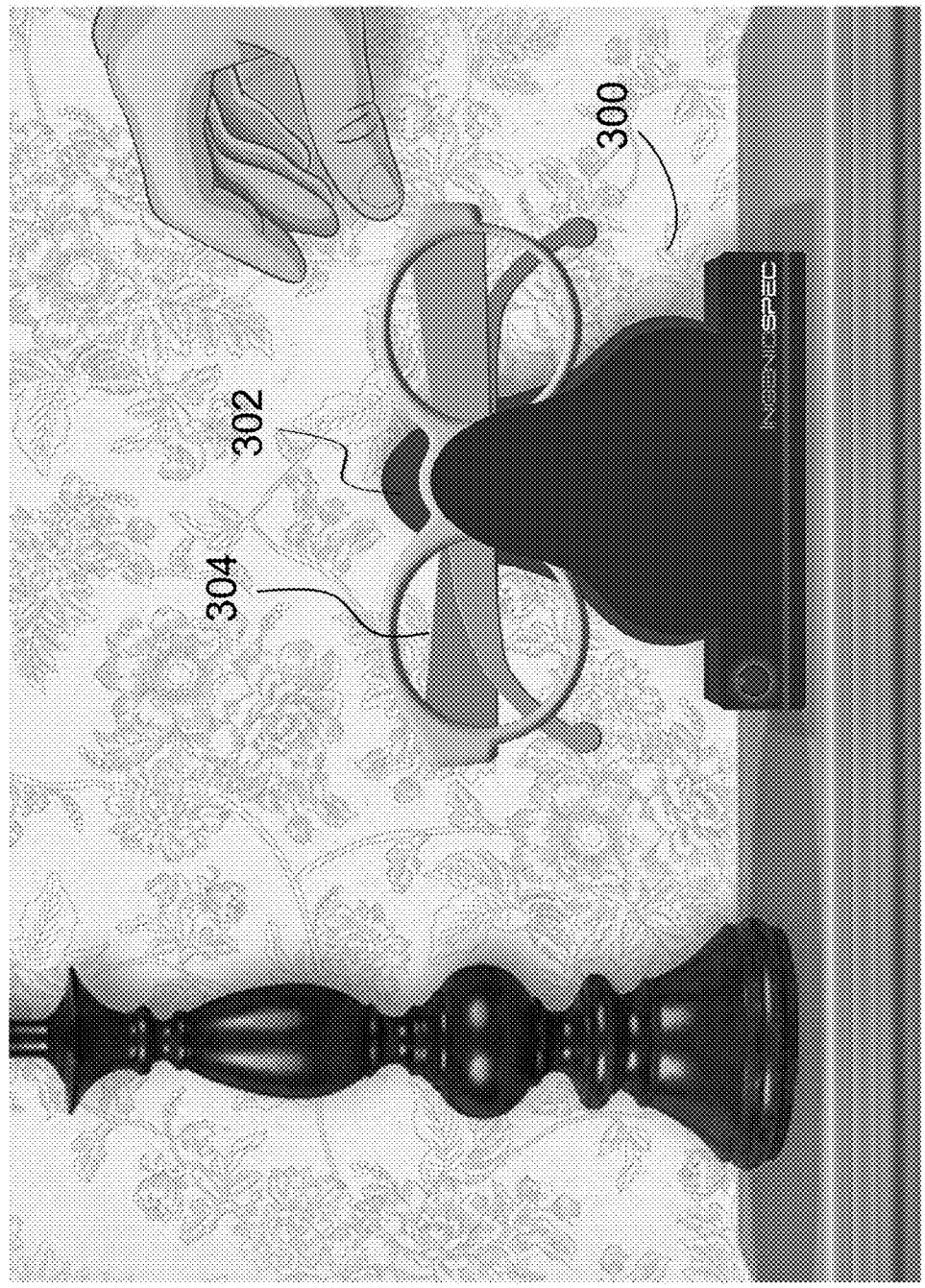
FIG. 3 shows an embodiment of an eyewear sitting in a structure that could help charge the eyewear.

FIG. 2 shows an embodiment of a plate 200 with a slot 202 to help charge an eyewear. In this example, transmitting charging coils can be in a wall area 204 at one end of the plate next to the slot 202. When the lens holders of an eyewear are in the slot, as shown, for example, in FIG. 2, the lens holders could be in close proximity to the transmitting charging coils in the wall area 204. Then via receiving charging coils, for example, in the lens holders, the battery within the eyewear could be charged.

In yet another embodiment, the eyewear could be placed on or in a structure, with areas in close proximity to parts of the eyewear, such as in close proximity to at least one of its arms, to charge the eyewear. One such structure 300 is shown, for example, in FIG. 3. There could be transmitting charging coils at a back panel 302 of the structure 300 to charge the battery within the eyewear, which could have receiving charging coils at least in one of the arms 304 of the eyewear. To illustrate, when the user retires at night and puts the eyewear on the structure 300 shown in FIG. 3, the eyewear's battery can be automatically recharged by transmitting charging coils in the back panel 302 sending charging signals to receiving charging coils in at least one arm 304 of the eyewear.

Figure 4:
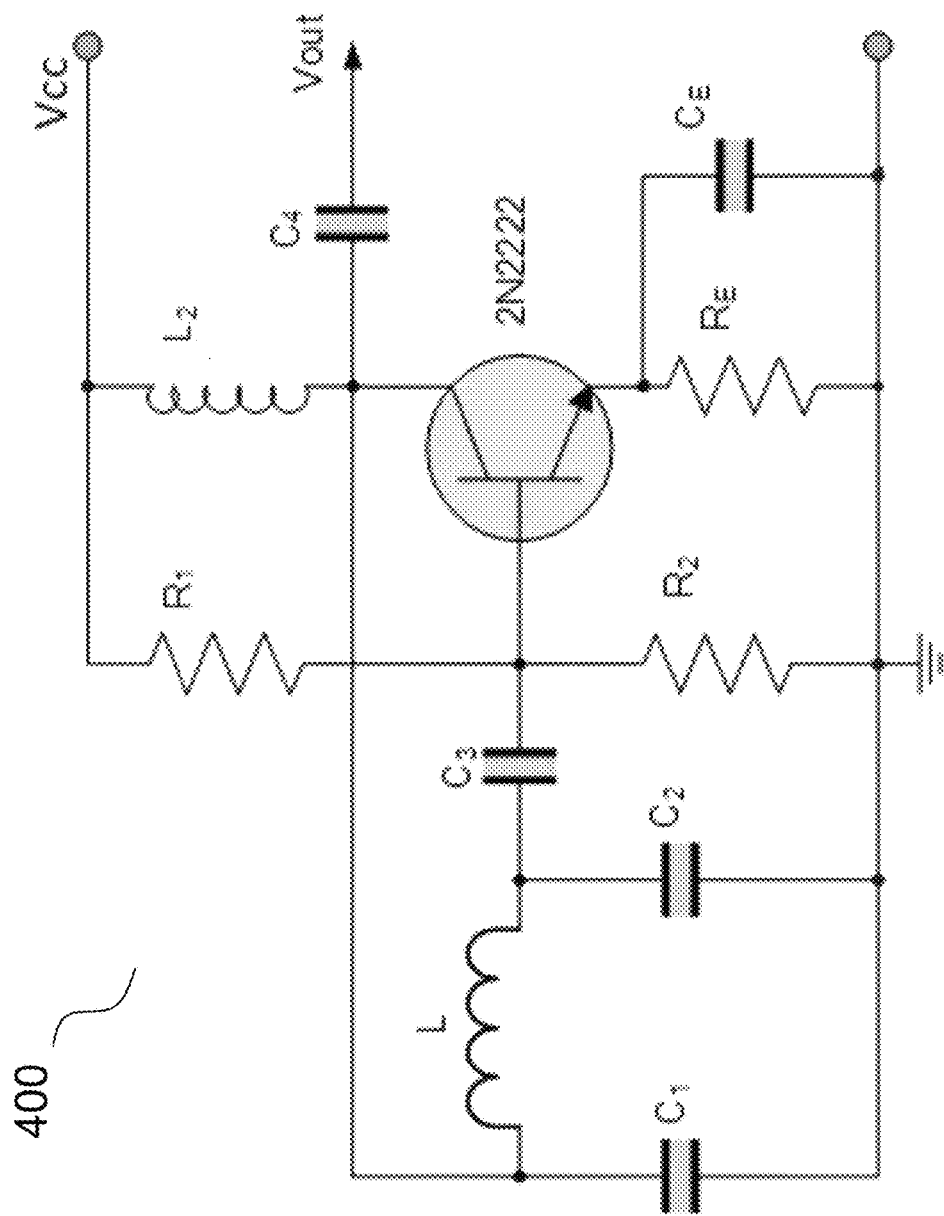
FIG. 4 shows an embodiment of an oscillator circuit for charging.

FIG. 4 shows an example of an oscillator circuit 400, serving as at least a portion of transmitting charging circuit for charging. The circuit 400 in FIG. 4 is sometimes known as a Colpitts oscillator. The circuit 400 includes an oscillator (such as the C1, C2 and L structure) generating AC signals at the base of a transistor (such as 2N2222). The output of the oscillator circuit, Vout, could be used to drive a set of transmitting charging coils, such as 10 turns of coils with a diameter of 1.5", connected between Vout and ground. With appropriate components, the oscillation could be at, for example, 140 KHz. One could also place an amplifier at Vout to increase its power to drive the transmitting charging coils. The oscillator circuit 400 shown in FIG. 4 is just an example. Other types of oscillator circuits can be used.

Figure 5:
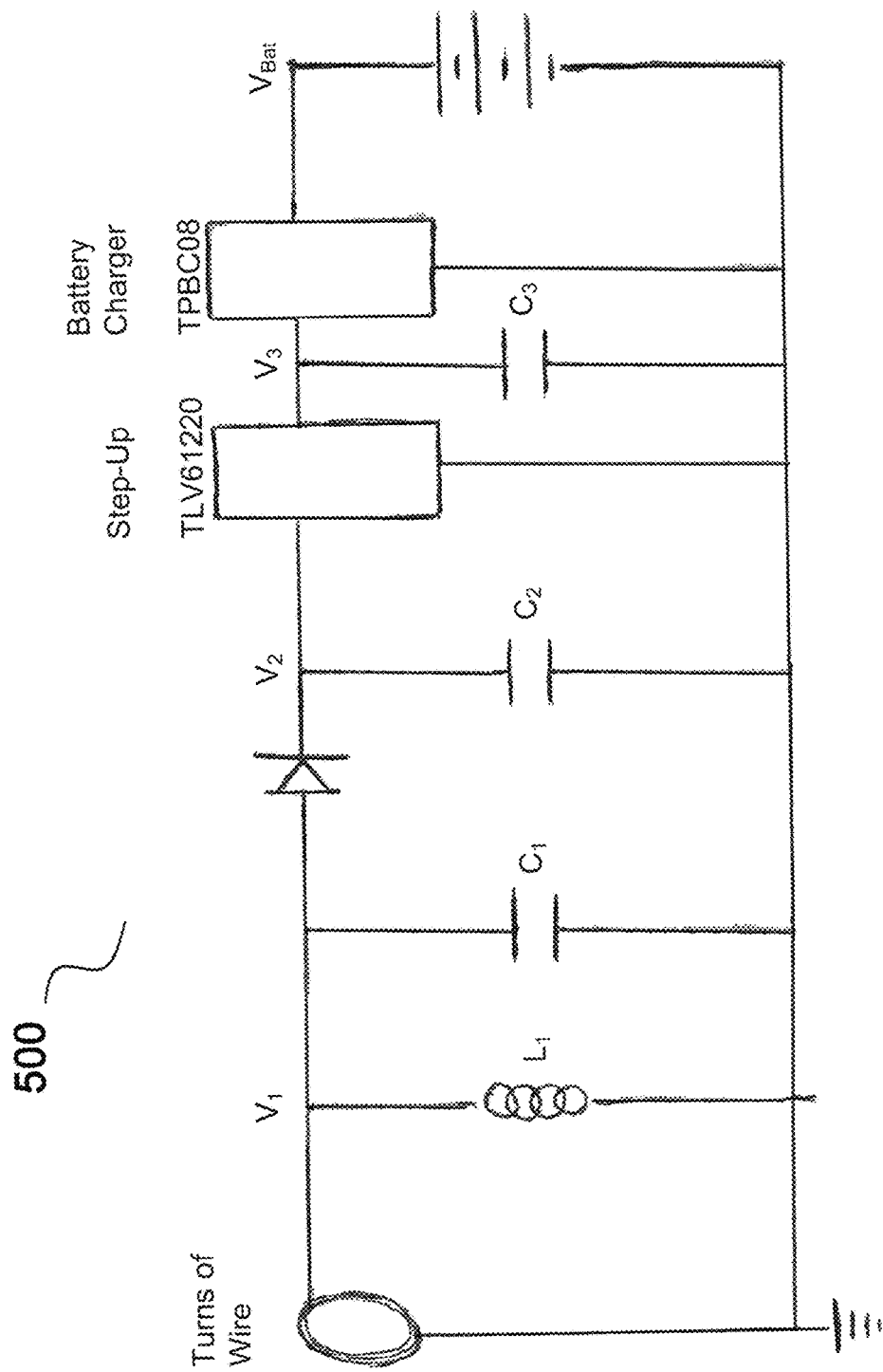
FIG. 5 shows an embodiment of a receiving charging circuit to charge a battery.

FIG. 5 shows an example of a receiving charging circuit 500 to charge one or more batteries, such as in an eyewear. The circuit 500 could include a set of receiving charging coils, such as 10 turns of coils or wires with a diameter of 1.5". The receiving charging coils could wirelessly receive charging signals from transmitting charging coils. AC signals at the outputs from the receiving charging coils, V1, could be connected to a resonator, such as L1 and C1, tuned at the charging frequency, such as 140 KHz. Then the AC signals at V1 can be converted to DC signals at V2, which can be stepped up by a voltage multiplier to raise the DC voltage to, for example, 5V at V3. The 5V DC signals can run a battery charger to charge a set of batteries at VBat in an eyewear.

Figure 6:
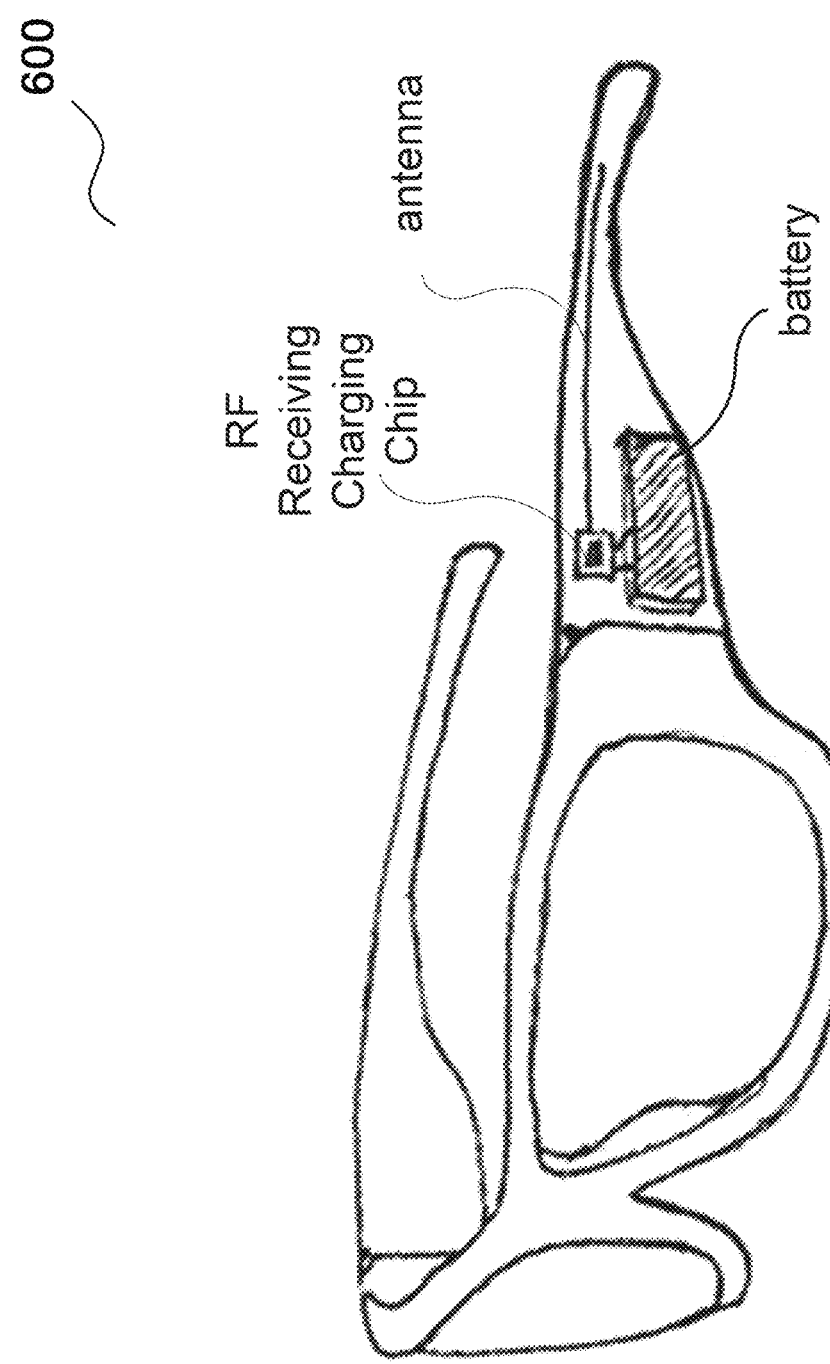
FIG. 6 shows an embodiment for RF charging in an eyewear.

Yet another charging mechanism can be via RF charging. FIG. 6 shows an example of such an implementation 600 in an eyewear. In the example, an antenna could run along an arm of the eyewear. The antenna can be tuned to the charging frequency, such as 2.4 Ghz, to wirelessly capture RF signals from a RF transmitting circuit. The captured RF signals could be received by a RF receiving charging chip to charge one or more batteries in the eyewear. The RF transmitting circuit with a corresponding charging antenna could be at a charging structure, such as at the back panel 302 of the structure 300 shown in FIG. 3, to generate the RF signals to charge the one or more batteries in the eyewear.

In one embodiment, when a battery within the eyewear is being charged, other than the charging electronics, other electronics in the eyewear could be off; and when the eyewear is not being charged, electronics in the eyewear could be on. This could be done, for example, by measuring a voltage at the charging electronics. A high voltage value could indicate the operation of charging being on, which could cause the other electronics in the eyewear to be turned off; and a voltage value below a threshold could indicate not charging, which could cause electronics in the eyewear to be on.

In one embodiment, the battery in the eyewear can be sufficient to operate the electronics in the eyewear for at least 24 hours when fully charged.

In one embodiment, the eyewear can notify the user when the battery level is low via an indicator, such as a visual indicator, like a LCD display or one or more LEDs. In another example, the eyewear could orally tell the user, via a speaker at the eyewear, that the battery level is low and should be recharged. To illustrate, when the battery level has dropped to 25% of its fully-charged value, the speaker could alert the user.

In one embodiment, the eyewear could monitor the heart rate of its user via a heart-beat sensor. Different embodiments of a heart beat in an eyewear are described in U.S. Pat. No. 7,677,723, entitled, "Eyeglasses with a Heart Rate Monitor," which is incorporated herein by reference.

In one embodiment, the eyewear could include a pulse oximeter. At least one of the nose pads of the eyewear could have the pulse oximeter. In another embodiment, instead of at the nose pads, a pulse oximeter can be clipped onto a portion of the ear of the user, such as the user's earlobe, or can be attached to other areas of the skin of the user with capillaries. Based on the measurements of a pulse oximeter, a controller in the eyewear could determine the % of oxygen in the user's blood.

In one embodiment, the eyewear can include a temperature sensor. Different embodiments of a temperature sensor in an eyewear are described in U.S. Pat. No. 7,380,936, entitled, "Eyeglasses with a Clock or other Electrical Component," which is incorporated herein by reference.

In one embodiment, the eyewear can include a motion sensor, such as a pedometer. Different embodiments of a motion sensor in an eyewear are described in U.S. Pat. No. 7,255,437, entitled, "Eyeglasses with Activity Monitoring," which is incorporated herein by reference.

In one embodiment, the eyewear can include a blood pressure sensor. In one embodiment, a blood pressure sensor can be based on optical Ballistocardiography and pulse oximetry. Electronics for both mechanisms could be at the nose pads of the eyewear, or they could be pressing onto parts of the skin of the user with capillaries. To illustrate, optical Ballistocardiography can measure physical displacements of a section of the user's skin as a function of the user's pulse. The optical device can be made as a mat of optic fibers with some emitting light, and some sensing with photo transistors. The user's pulses can vibrate the skin, which could press onto the mat (such as the mat at a nose pad). The vibrating skin could alternately compress and relax the mat of fibers, leading to the light received by the photo transistors to be modulated as a function of the movement of the mat. With that, optical Ballistocardiography could produce a first pulse signal waveform. The pulse oximeter could produce a second pulse signal waveform. Depending on the time-lag between the two waveforms, a controller in the eyewear could calculate the user's blood pressure.

In one embodiment, the eyewear can include a blood glucose sensor. The blood glucose sensor could be at a nose pad of the eyewear.

In one embodiment, to save battery, one or more of the sensors do not sense the user continuously, but at regular intervals, such as every 10 minutes. Different sensors could sense at different intervals. For example, in one embodiment, heart rate could be monitored more frequently than temperature.

In one embodiment, the eyewear could alert a user to drink water, eat, exercise, weigh himself, sleep, and/or involve in other activities. This could be based on time. In one embodiment, typical times can be used, such as alerting the user to have dinner at 6 pm.

In one embodiment, the eyewear could be programmed to be tailored to the user, for example, supporting a set of predetermined routine. To illustrate, the eyewear could be programmed to alert the user to take medication (such as asking the user, "Taken the medication yet?"), follow a treatment plan, and/or sleep at specific times. As to taking medication, the eyewear could alert the user how and when to take medication, and what medication to take. The eyewear could alert the user to walk a little more, if the user has not walked much that day (as shown, for example, by a pedometer in the eyewear). Or, at certain time each day, the eyewear could tell the user major news of the day. These could be major news identified by Facebook, and wirelessly downloaded to the eyewear.

In one embodiment, the eyewear can be wirelessly coupled to a calendar to remind the user of appointments, such as "time to play bridge in the lunch room." The calendar could be downloaded to a memory device in the eyewear, such as when the user has a new calendared event for the calendar. In another example, a new calendared event could be entered, such as wirelessly, into the calendar in the eyewear. In yet another example, a new calendared event could be entered wiredly via a connector, such as a USB connector, into the calendar in the eyewear.

In one embodiment, based on motion monitored by a pedometer in an eyewear, the eyewear could alert the user, such as by 5 pm, to walk another certain number of steps before the end of the day.

In one embodiment, the eyewear could alert a user by sound, such as via an ear bud coupled to the eyewear. The alert could be based on an audio tone, such as beeps. In another embodiment, the alerts can be via human voices, and could be in a language preferred by the user.

In one embodiment, the eyewear could send emergency alerts to others. For example, the eyewear could send emergency signals wirelessly to a near-by device, such as the user's cell phone, which could automatically make a cellular call to an interested party. In another embodiment, the eyewear could send emergency signals directly to the interested party.

In one embodiment, the eyewear could periodically, such as every 12 hours, wirelessly send its monitored data to an interested party, who could review the data, to determine if there are issues of concern. Or a system could analyze the data. Such analysis could be performed automatically, and the interested party could be alerted if there is an issue. The wireless transmission could be performed via another device in the vicinity of the user. The eyewear could send the monitored data to the another device, such as wirelessly to the user's cell phone, or wiredly to a computer that is plugged to a wall power outlet. In another embodiment, at least a portion, or a significant portion, or all of the analysis can be performed by a processor in the eyewear.

In one embodiment, a user could activate an emergency call. To prevent false alarm, one embodiment can require the user to press and hold a switch or button at the eyewear and let go. Then an interested party would call the user, and ask if the user needs assistance. In another embodiment, the user needs to press and hold the switch twice to initiate a distress call.

In one embodiment, the eyewear could have just a switch for a user to activate, and the switch can be a switch to at least activate an emergency call. For example, the user could activate the switch by pushing it. The switch can be made conspicuously. In addition to the switch, the eyewear could also include a microphone to receive the user's voice input. In another embodiment, the eyewear could include at least a speaker, which could be at an ear bud, and the eyewear could also include a user-controlled volume-changing switch to change the volume of the speaker. The simplicity of having fewer switches at the eyewear for a user to activate or push could help make the eyewear easier for a senior to use.

In one embodiment, the eyewear includes voice recognition software or firmware embedded therein. The software could have a dictionary to recognize words and sentences commonly used in specific areas, such as in time of emergency. For example, when the user wears the eyewear, the eyewear can passively listen. The eyewear could be programmed to be activated by a specific word. When that word is captured by the eyewear, the eyewear could try to recognize subsequent voice inputs based on its voice recognition capabilities.

In one embodiment, the eyewear could send out emergency call if, for example, abnormal signals or signals below certain preset thresholds have been tracked by the eyewear. To illustrate, if a pulse oximeter indicates that the oxygen level of the user is below 93%, an emergency call could be sent out to an interested party, with the reasons of the call also included. Or a caregiver could be automatically sent to check on the user.

In one embodiment, the eyewear also can include a cellular phone that could at least receive calls.

In one embodiment, the eyewear can include a connector, which could be used to download monitored information from the eyewear. Different embodiments of a connector coupled to an eyewear are described in U.S. Pat. No. 7,500,747, entitled, "Eyeglasses with Electrical Components," which is incorporated herein by reference.

In one embodiment, instead of downloading via a connector, monitored information or data could be accessed wirelessly. In another embodiment, the wireless access can be via a short-range wireless network, such as Bluetooth. The information in the eyewear could be password protected.

In one embodiment, the eyewear can include a light, such as a LED, which can turn on if the eyewear is worn at specific time frames, such as in the middle of the night. The time period to turn on the light could be programmed. Turning on the light can also depend on the user putting on the eyewear, which could, for example, activate the eyewear. In other words, in this embodiment, the light could turn on if the eyewear goes from the off state to the on state during the specific time frames. In one embodiment, the light can automatically turn off after a predetermined period of time, such as 3 minutes. To turn it back on, in one embodiment, one could take off the eyewear and put it back on again. In another embodiment, the user could activate or turn on the light manually via, for example, a switch at the eyewear. In yet another embodiment, the user could turn on the light via voice, with the eyewear having voice recognition electronics.

In one embodiment, the eyewear can include hearing enhancement abilities. Different embodiments of hearing enhancement abilities in an eyewear are described in U.S. Pat. No. 7,760,898, entitled, "Eyeglasses with Hearing Enhanced and Other Audio Signal-generating Capabilities," which is incorporated herein by reference.

In other embodiments, the glasses can have a number of hearing enhancing capabilities. In one embodiment, the hearing enhancement is for those with mild or medium hearing loss. In another embodiment, the hearing enhancement is for those with severe hearing loss.

One hearing enhancement functionality is frequency-dependent amplification. For example, higher frequencies are amplified more than lower frequencies; certain frequency bands are not amplified; or the frequencies to be amplified are tailored to the user.

To tailor the amplification to a user, hearing enhancement capabilities can be calibrated against the user. The calibration can be done by the user or by a third party. The calibration can be performed through a website, which guides the user through the process. The calibrated frequency hearing profile of the user can be stored. Such calibration can be performed periodically, such as once a year.

In one embodiment, the user can perform the calibration by himself/herself. For example, the audio frequencies are separated into different bands. The glasses generate different SPL at each band. The specific power level that the user feels most comfortable would be the power level for that band. Alternatively, the glasses could generate different tones in different frequency bands. The user could compare the tones and rate the perceived loudness. In this process, the glasses can prompt the user and lead him through the process interactively. Based on the measurements, the glasses could create a calibration curve, which becomes the personal hearing profile for that user. After calibration, signals received in different bands, such as by a microphone in the glasses, will be amplified or attenuated according to the hearing profile.

In one embodiment, the eyewear can include a position identifying system, such as a GPS device, or other position identifying system, such as a system using wifi and/or cellular networks via, for example, triangulation. In one embodiment, a combination of more than one position identifying systems could be used to identify position, and the combination could become the position identifying system. In one embodiment, the position identifying system can be normally off and activated remotely to track the position of the eyewear. For example, the user could send out an emergency call to an interested party, who could activate the position identifying system. This could be used to track the user, such as when the user is lost, and provide instructions orally to guide the user home. In one embodiment, the user could activate the position identifying system, and the system could guide the user to a preset place, such as back home via, for example, voice.

In one embodiment, the eyewear can include a lanyard, which could be permanently attached to the eyewear. The lanyard could be attached to a battery pack to provide power (or additional power) to electronics in the eyewear. Different embodiments of electronics tethered to an eyewear are described in U.S. Pat. No. 7,192,136, entitled, "Tethered Electrical Components for Eyeglasses," which is incorporated herein by reference.

In one embodiment, the eyewear could detect if the user has fallen. For example, the eyewear could include an accelerometer. As one example, if the eyewear (a) detects an accelerating and then a stop, (b) with the being-worn sensor indicating eyewear being worn, and (c) with little or no subsequent motion, the eyewear could assume the user has fallen, and send an emergency signal to an interested party. In another embodiment, the eyewear also could include a up/down sensor (or level sensor) showing the orientation of the eyewear. If the eyewear detects the above, with the eyewear orientation still showing it being in at least a substantially up orientation at the stop, the eyewear could send out an emergency signal asking an interested party to contact the user.

Different embodiments could be used to determine, for example, if a user wearing the eyewear is in danger, such as has fainted. One approach could be based on changes in the patterns of the monitored measurements, as determined by a controller in the eyewear. For example, the eyewear can be aware of the average heart beat or heart beat pattern of the user. A dangerous condition could be significant deviation from the average. Another approach could be based on measurements and/or changes in the patterns of measurements from different sensors in combination. For example, the eyewear has detected that the user might have fallen, and a microphone in the eyewear detects no sound from the user in a subsequent duration of time.

In one embodiment, in response to detecting danger, an interested party could try to contact the user. For example, the interested party could call the user and ask the user to, for example, push a button on the eyewear, such as pushing the button multiple times if the user is in danger.

In one embodiment, the eyewear can include an imaging system, such as a camera. The imaging system could be used, for example, to read barcodes off products, such as medicine bottles. And a controller in the eyewear could identify the product based on the barcodes read. In one embodiment, the imaging system could be a 3D imaging system, and the controller could, for example, identify the product based on its 3D image. Different embodiments of eyewear with cameras are described in U.S. Pat. No. 7,806,525, entitled, "Eyeglasses having a camera," which is incorporated herein by reference.

Figure 7:
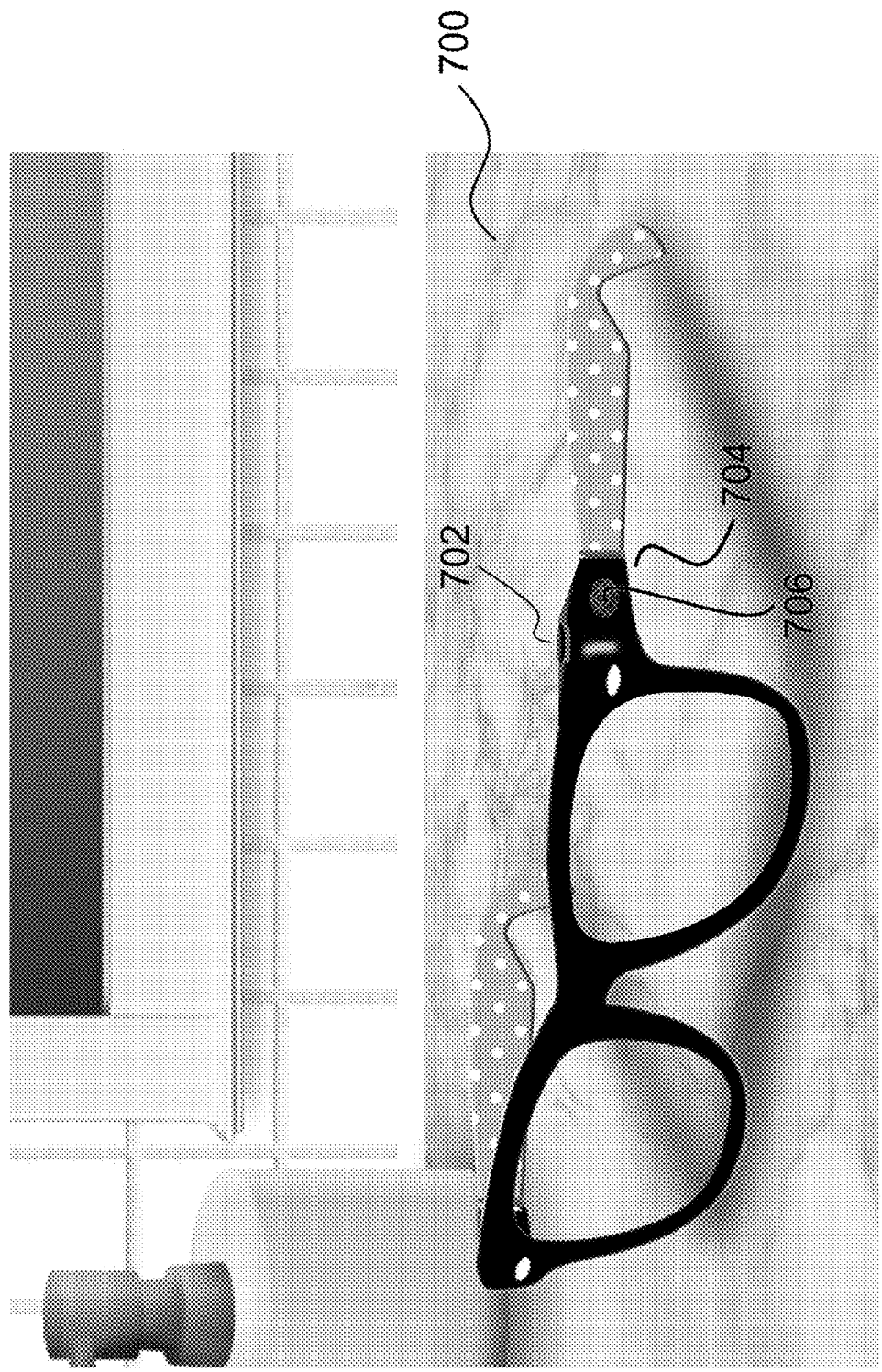
FIG. 7 shows an embodiment of an eyewear that a senior can use.

In one embodiment, as shown, for example, in FIG. 7, the eyewear 700 includes (a) a button 702, which could be at an extended endpiece 704 of the eyewear 700, such as at its top surface (Different embodiments of eyewear with extended endpieces are described in U.S. Pat. No. 8,109,629, entitled, "Eyewear Supporting Electrical Components and Apparatus Therefor," which is incorporated herein by reference); (b) at least a microphone, which could be at an extended endpiece of the eyewear; (c) at least a speaker 706, which could be at an extended endpiece of the eyewear; (d) at least a battery, which could be at an extended endpiece, or could be at an arm, of the eyewear; (e) a battery indicator; (f) voice recognition capability, with a digital assistant, to respond to a limited range of requests in voice; (g) a phone directory; and (h) cellular connection capabilities. The eyewear could also include a local wireless system that could track locations (such as based on WiFi signals), or a navigation satellite system that could track locations (such as a GPS system); and a pedometer. The eyewear could further include inductive charging ability, such as, for example, with wires at lens holders or arms of the eyewear. The eyewear, including the button, the microphone, and the speaker, could be waterproofed.

For the above embodiment, in operation, for example, such as when the button is pushed once, the digital assistant could respond to a limited range of requests from the user, such as: "What is the time?"; "Major news today?"; "Have I walked enough today?"; "Call Andy for me."; "Louder."; "Softer."; "What is the time?"; "Help!"; "Everything is fine."; and "How do I get home from here?" The digital assistant could be trained to respond accordingly. For example, if the question is "How do I get home?", the digital assistant could respond, for example, by providing turn-by-turn directions via the built-in position identifying system to the user. The interaction with the digital assistant could be in a language preferred by the user.

In one embodiment, the user could use the eyewear to listen to audio books. For example, one or more digital books could be stored in or downloaded into the eyewear. The embodiment could include a display, such as a LCD display, to show the books and allow the user to scroll down the list of books to select the one the user wants. The books could be categorized. The user could select a category to have books under the category listed. Selection could be done via a button or a switch at the eyewear. In one embodiment, selection could be done via voice. In the embodiment with a digital assistant, the user could ask the digital assistant to start playing a digital book by describing to the digital assistant the book, such as telling the assistant the title of the book. In another embodiment, if the eyewear does not have the book, the digital assistant could find out how much it would cost to get the book, such as from Amazon, and ask the user if the user wants to acquire the book. If the user wants to, the digital assistant could download the book, such as from Amazon, based on, for example, the user's charge card information previously stored in the eyewear.

In one embodiment, the eyewear could include noise cancellation circuits, such as based on multiple microphones. For example, there could be a first microphone in an area on a top portion of the eyewear, such as a top portion of a lens holder or a top portion of an arm of the eyewear, for capturing sound from the environment. And there could be a second microphone in an area on a bottom portion of the eyewear, such as a bottom portion of a lens holder or a bottom portion of an arm of the eyewear, for capturing the user's voice. The audio signals from the second microphone capturing the user's voice could be adjusted based on the audio signals from the first microphone for noise cancellation, via techniques known to those skilled in the art.

In one embodiment, the eyewear could also identify where the user parked via another device in the car of the user; turning light on or off when asked, if the eyewear includes a light output, which could be pointing forward at an extended endpiece; and asking the user some brain exercise questions.

In one embodiment, if the digital assistant can't help, it could connect the user to a live professional operator (e.g. via cellular connection). The user can also connect to the operator directly at any time by quickly tapping the button, such as two or more times within a second. The operator can offer more personalized assistance, including responding to more difficult requests, or connecting the user to the right person for the situation, such as a close relative, as needed. When the battery is low, the battery indicator could provide an indication to the user, and the indication could be oral via the speaker.

In one embodiment, the eyewear could detect if the user has fallen. For example, the eyewear could include an accelerometer, which could operate as a motion sensor, such as a pedometer. As one example, if the eyewear detects an accelerating and then a stop, with little or no subsequent motion, the digital assistant could orally ask the user whether everything is fine. If the user doesn't respond, the eyewear could assume the user has fallen, and send an emergency signal to an interested party. In another embodiment, the eyewear also could include a up/down sensor (or level sensor) showing the orientation of the eyewear. If the eyewear detects the above regarding a fall, (a) with the eyewear orientation still showing it being in at least a substantially up orientation at the stop, and/or (b) with the eyewear orientation showing it being not in a substantially up orientation after the stop for a duration of time, the digital assistant could orally ask the user to respond. If the user doesn't respond, the eyewear could assume the user has fallen, and send an emergency signal asking for a caregiver to check on the user. In one embodiment, the caregiver, in addition to using the position identifying system in the eyewear, could also activate the eyewear wirelessly to give out a beeping sound to help the caregiver locate the user.

In one embodiment, the digital assistant can engage in simple dialogues with the user. This could be initiated by the user, such as by the user pushing the button and starting to talk to the digital assistant. For example, the user could say, "I don't feel good." The assistant could respond openendedly, such as, "Why don't you feel good?" Through the dialogue, the assistant could spot patterns in the user's spoken language.

For example, once a day, or several times a day, the assistant could ask the user how the user is feeling, and could offer choices for the user to select to respond, such as lonely, sad, or depressed. Then the digital assistant could recognize words and phrases in subsequent dialogues with the user that could be contextually likely to be associated with the selected choice. In one embodiment, the assistant could provide some simple counseling based on standard cognitive behavioral therapy. In another embodiment, if the assistant decides that the user is depressed, the assistant could suggest activities the user likes that could enhance the user's mood or distract the user. For example, the assistant could play some music the user likes.

In one embodiment, the digital assistant could be trained to analyze (a) syntactic patterns in the user's words, such as the frequency of nouns used versus adjectives; (b) classes of words the user uses, such as whether they are more related to perception or action; (c) how often the user talks to the digital assistant; (d) whether the user changes topics more abruptly than the user's average responses; and (e) acoustic features, such as changes in volume, pitch, and frequency of pauses by the user.

In one embodiment, the digital assistant could identify dangerous signs. For example, by analyzing dialogue from the user for an extended period of time, the assistant could identify a drastic change in the user's verbal communication. Note that the analysis could be done by a remote device, based on the user's daily communication data transmitted by the eyewear. Or, in another embodiment, the analysis, or a portion of the analysis, could be done by the eyewear. The analysis could be based on machine learning. In view of the dangerous signs identified, in one embodiment, a professional operator or a close relative of the user could be alerted, and this could be done, for example, by the digital assistant.

One embodiment for voice recognition could use processors or servers remotely accessed via the Internet (such as in the cloud), such as GPU, to train the voice recognition models, which can be a machine learning-driven task. And the embodiment could use a lower power processor, a client processor, or an edge processor in the eyewear to run inferences. In one embodiment, with the models trained, the client processor could run voice recognition without the need to wirelessly call the servers. This could lead to consuming less power, reducing latency, and giving a better user experience. In another embodiment, the eyewear could directly interact with the remote servers without using a client processor.

In one embodiment, for the client processor, the eyewear could use a lighter-version TPU (Tensor Processing Unit), a custom chip optimized for inference in edge devices. Instead of using TensorFlow, a Google machine learning development platform, other embodiments could use development platforms, such as Caffe2 or PyTorch.

Instead of voice recognition, different embodiments could train and/or use machine learning models in the remote servers for other applications, such as image recognition.

In one embodiment, the eyewear could include mental exercises to sharpen mental skills of the user, such as word games, testing recall, and doing math mentally. In another embodiment, the eyewear could play games or other activities with the user to entertain the user. As an example, this could be administered to the user verbally by the eyewear.

In one embodiment, the eyewear could turn off automatically if there is no audio input, such as from the user, received for a preset amount of time, such as 2 minutes. In another embodiment, the user could ask the digital assistant to turn the eyewear off by, for example, saying, "Goodbye, glasses." In one embodiment, the eyewear or the digital assistant could be programmed to be called a name, such as Joe. To turn the eyewear off, the user could say, "Goodbye, Joe."

In one embodiment, instead of or in addition to a button, the eyewear could be programmed to be activated by voice, such as when the user said a specific word or phrase. When that word/phrase by the user is captured by the eyewear, the eyewear could be activated. In one embodiment, the eyewear, with voice recognition capability, does not have the button and could be activated by voice. In one embodiment, when the eyewear is activated, a digital assistant in the eyewear could address the user.

In one embodiment, the eyewear could be wirelessly coupled to a medicine box. This could be done via short-range wireless communication system, such as Bluetooth. When the medicine box is opened, the box could send a signal to the eyewear. The signal could be an indication that the user has initiated an action to take medication. The signal could also initiate an audio script by the eyewear as to the medication to take and how much. In another example, based on time monitored by the eyewear, the audio script could indicate to the user that it is not time to take any medication yet.

In one embodiment, the eyewear could be coupled, such as wirelessly coupled, to a remote medical monitoring system. The system could keep track of measurements performed by the eyewear on a user, and perform analysis accordingly. Different embodiments of a medical monitoring system are described in U.S. Pat. No. 8,112,293, entitled, "Medical monitoring system," which is incorporated herein by reference.

In one embodiment, the eyewear could wirelessly interact with one or more other types of electronic devices in its vicinity (or local e-devices). A local e-device could be at one's property indoor or outdoor. It typically includes computing and communication electronics that, for example, allow it to interact, pair, or be authorized to participate and communicate via a local network or short-range wireless network (e.g. a wifi network or a Bluetooth network) with at least the eyewear. In one embodiment, a local e-device can be an IOT device. In another embodiment, a local e-device can be connected to an electrical power outlet at a wall. In yet another embodiment, a local e-device could also interact wirelessly with one or more other local e-devices in its vicinity.

In one embodiment, a local e-device could be an indoor device, such as in a house of the user.

In one embodiment, an indoor device could be coupled to an apparatus or a physical object in an indoor environment, such as in the house of the user; and the apparatus includes at least a status that could be changed by the user. As the status changes, a signal could be sent to the indoor device, which could send a corresponding signal to the eyewear. The eyewear does not have to be fully turned on, but can be in a listen mode to receive the signal, and the eyewear could act according to the signal received.

For example, the apparatus could be a stove with, for example, a status indicating a burner being turned on or off; a refrigerator with, for example, a status indicating its door being opened or shut; a door (such as a garage door, a front door or a patio door) with, for example, a status indicating it being opened or closed; a faucet with, for example, a status indicating it being turned on or off; and a shower with, for example, a status indicating it being turned on or off.

In one embodiment, as the user changes a status of an apparatus, the corresponding indoor device could send a signal to the eyewear of the user (which could be worn by the user), alerting the eyewear of the change. In another embodiment, if the status is changed in a way different from its norm, an alert signal could be sent to the eyewear. Depending on the alert signal received, the eyewear could react accordingly.

For example, when the user turns on a burner at a stove, an indoor device of the stove could send a wireless signal regarding the burner being turned on to the eyewear of the user. In one approach, a digital assistant at the eyewear could alert the user if the eyewear has not received from the indoor device another wireless signal regarding the burner being turned off after a preset amount of time.

As another example, when the user opens a door, an indoor device at the door could send a wireless signal regarding the door being opened to the eyewear of the user. In one approach, an alert signal at the eyewear could notify the user if the eyewear does not receive from the indoor device another wireless signal regarding the door being closed, such as after a preset amount of time.

In one embodiment, an indoor device can be used to open the door of a user's house. For example, the corresponding system could include at least two local e-devices, such as a microphone/speaker device at the door and a lock-control device controlling the lock of the door. When a visitor, for example, rings the door bell, the user could turn on the eyewear and ask the digital assistant to ask the visitor questions, such as the visitor's identity and the purpose of the visit, via the speaker at the door. The visitor's response can be captured by the microphone at the door, and presented to the user via the eyewear. If the user wants to open the door, the user could instruct the digital assistant to remotely open the door via the lock-control device. The digital assistant could re-confirm with the user before remotely activating the lock-control device to open the door. In one embodiment, the door bell also could be a local e-device. When the visitor rings the door bell, the eyewear could be notified, which, in turn, could notify the user accordingly.

In another embodiment, the corresponding system to open the door of a user's house could include a video camera to capture video/images of the visitor and transmit such information to the user via, for example, a display. In one embodiment, the display could be at the eyewear. In another embodiment, the display could be a monitor external to the eyewear. The eyewear could alert the user to watch the captured video/images.

In one embodiment, an indoor device can be used to lock a door, and the lock could be controlled electrically. In one embodiment, the device could be electrically coupled to the lock; and in another embodiment, the device includes the lock. A user could control to lock the door via the user's eyewear, which can be wirelessly coupled to the indoor device.

In one embodiment, an indoor device could be used to adjust one or more thermostats in the house. In one embodiment, an indoor device could be used to turn on/off or dim one or more lights in the house. In one embodiment, an indoor device could be used to control one or more other appliances in the house. In one embodiment, the adjustment/control could be through a digital assistant in the eyewear.

One embodiment previously described includes a medicine box sending signals to the eyewear. In one embodiment, a medicine holder could include an indoor device. When the medicine holder is opened, the indoor device could send a message to the eyewear. If the user opens the medicine holder again the same day, based on another message from the indoor device, the eyewear could alert the user that the holder has been opened before that day.

As yet another example, an indoor device could monitor one or more statuses of a car, such as the location of the car. After the car has been parked for a preset amount of time, such as 15 minutes, inside a garage of the house of the user, if a digital assistant in the eyewear has not received a signal from the indoor device that the car has been turned off, the digital assistant could alert the user.

In one embodiment, a signal from the eyewear to the user, such as an alert signal, could be a beeping sound. In another example, such a signal could be optical, such as via light from a LED at the eyewear. In yet another example, such a signal could be a voice message from a digital assistant from the eyewear.

In one embodiment, an indoor device of an apparatus could restrict the user from using the apparatus unless the user could satisfy certain predetermined criteria. For example, the apparatus could be a gun or a chain saw, which could be stored in a container. When the user wants to open the container or when the user wants to operate the apparatus, the user could, for example, be asked a question, such as the address of the house with the apparatus. Whether the user could answer the question correctly determines if the user could use the apparatus. In one embodiment, the indoor device could have the apparatus send a signal to the eyewear, requesting the eyewear to ask the question and to monitor the answer. Or, the indoor device could have the apparatus ask the question and monitor the answer, and send information regarding the interrogation, including the monitoring, to the eyewear.

In one embodiment, an alert or a signal from the eyewear regarding the status of a corresponding apparatus could be deactivated. For example, a digital assistant could alert the user after a burner at a stove has been turned on for 5 minutes. To illustrate, it turns out the user is making a stew, and the user could tell the digital assistant not to send any more alert regarding this episode. Or, the user could ask the digital assistant to send a reminder after a certain amount of time, such as 30 minutes. In another embodiment, the digital assistant could be configured to override the user's request of not sending any more alert if after a unreasonable or predetermined amount of time, the eyewear still has not received any signal regarding the burner being turned off.

In one embodiment, a local e-device could be an outdoor device in the vicinity of the eyewear.

In one embodiment, an outdoor device could be coupled to an apparatus or a physical object out in the open; and the apparatus includes at least a status that could be changed by the user. As the status changes, a signal could be sent to or received by the outdoor device, which could wirelessly send a corresponding signal to the eyewear.

For example, the apparatus could be a car door with at least a status indicating the door being opened or closed. When the user opens the car door, an outdoor device at the door could send a wireless signal regarding the door being opened to the eyewear of the user. In one approach, a signal at the eyewear could notify the user if the eyewear has not received from the outdoor device another wireless signal regarding the door being closed, such as after a preset amount of time.

In one embodiment, an outdoor device could be in a car, and could be electrically coupled to batteries in the car and a position identifying system in the car that could track locations (such as via a navigation satellite system). An eyewear could be wirelessly coupled to the outdoor device via, for example, a wifi network or a cellular network. To illustrate, the car is in an outdoor parking lot, and a user could not find it. The user could ask a digital assistant in her eyewear for guidance. The digital assistant could send a wireless signal to the outdoor device. The outdoor device would determine its position (or the position of the car) via the position identifying system in the car. Then the outdoor device could wirelessly message the position to the digital assistant. The digital assistant could determine the position of the eyewear via a position identifying system in the eyewear. Based on the positions of the outdoor device and the eyewear, the digital assistant could guide the user back to the car.

In one embodiment, a local e-device could couple to an object, and operate both indoor and outdoor, in the vicinity of the eyewear.

A number of examples have been described regarding local e-devices. In one embodiment, at least each local e-device that is configured to interact with the eyewear has an unique identifier relative to other local e-devices that are configured to interact with the eyewear. This could serve as a way to distinguish signals from one local e-device relative to signals from another local e-device, received by the eyewear.

In one embodiment, the eyewear could keep track of its interactions with the one or more local e-devices in its vicinity. The eyewear could analyze the interactions; or information regarding the interactions could be sent, such as wirelessly, to another computer to be analyzed. In one embodiment, based on the analysis, norms could be established regarding typical, normal, or regular behavior of the user toward different physical objects indoor or outside in the open.

In one embodiment, if a user behavior to a physical object indoor or outside in the open is significantly different from the corresponding norm, a digital assistant in the eyewear could ask the user whether there is any concern. Based on the user's response, the digital assistant could notify different persons of interest, and could present to them what has happened. In one embodiment, significantly different from the norm could be more than one and a half standard deviations from the norm or mean. In another embodiment, significantly different from the norm could be two or more than two standard deviations from the norm or mean.

In one embodiment, the eyewear includes an imaging system, which could include one or more cameras, such as optical cameras and/or infrared cameras. The imaging system could be used to gather images, which could be videos, of the environment of the eyewear. The images could be analyzed to help the user. The analysis could be done at the eyewear. In another embodiment, the eyewear could be wirelessly coupled to a computing device, and the eyewear could send the images to the computing device to perform the analysis. The computing device could be coupled to the eyewear via a local network (e.g. a local area network, or a wifi network). After the analysis, the computing device could send the results back to the eyewear.

For example, the user is standing in front of an oven and does not know how to operate the different buttons on the oven. The user could ask the digital assistant in the eyewear, and the digital assistant could have the imaging system took images and then have them analyzed to help the user. If the user is not satisfied with the help, the user could ask the digital assistant to have the images sent to a live person and connect the user to the live person to help the user. In one embodiment, the imaging system could keep taking images, which could be videos, of the oven as the user is talking to the live person, who could help the user to operate the different buttons on the oven.

In another embodiment, when the user is standing in front of a stove and tries to turn on the stove, an indoor device at the stove could, for example, ask the user a question before the stove can be turned on. In yet another embodiment, the indoor device could send a signal to the eyewear, which could be in a listening mode. The signal could activate the eyewear, which could analyze the signal, and ask the user a question. For example, the question could be, "Why do you want to use the stove?" The user could respond, "I want to heat up some soup." The response can be analyzed, based on, for example, natural-language processing techniques, to determine if it is an allowed activity in the context of operating a stove. The analysis could use different pre-configured rules. For example, a rule could be time based, such as certain activities being allowed at a certain time, but not allowed at a different time.

In one embodiment, if the response is deemed appropriate, then the requested action would be permitted. For example, the user could turn on the stove if the response is deemed appropriate. However, if the response is deemed not appropriate, then the user would not be able to turn on the stove. The eyewear, the indoor device at the stove, or the stove, could inform the user, for example, that it is not a good time to use the stove, such as to heat some soup.

In another embodiment, the imaging system could include additional sensors to assist the user. For example, the imaging system could include a flame detector to detect flames, such as flames of a stove; and the eyewear can interact with the user to insure the stove is used appropriately. To illustrate, one rule could be that two burners should not be turned on and left on for a preset amount of time. Based on such a rule, if the imaging system determines that two burners have been turned on for more than the preset amount of time, such as 10 seconds, the eyewear could react, such as alert the user, accordingly. For example, the eyewear could interact with a corresponding indoor device at the stove, which could react accordingly, such as turning down the flames at both burners or turning both burners off.

In yet another embodiment, the eyewear can also take and analyze images to see if the user is actually using the stove appropriately, such as to heat soup. Based on the analysis, the eyewear could act accordingly. For example, the eyewear could send signals to an indoor device at the stove to have the stove operated accordingly.

In one embodiment, instead of performing the analysis, the eyewear could communicate with a supervising person to determine whether the user is allowed to perform certain activity. For example, when the user wants to turn on a stove, a corresponding indoor device could alert the eyewear, which could take images of the user intending to turn on a stove, and send the images to the person. Or, the eyewear could send a text message to the person asking whether it is ok for the user to use the stove, such as to heat soup. Based on the response from the supervisor, the eyewear could send a corresponding signal to the indoor device to act accordingly. For example, if the corresponding signal is no, the indoor device could forbid the stove to be turned on.

A number of embodiments have been described regarding an eyewear interacting with the one or more local e-devices in its vicinity. In one embodiment, instead of an eyewear, the embodiment could include a wearable device interacting with the one or more local e-devices in its vicinity. The wearable device could be in the format of a watch, a wristband, a piece of jewelry, a chest strap, a piece of clothing, or other types of devices wearable on the body of the user.

Different embodiments regarding an eyewear have been described. The eyewear could be, for example, a pair of sunglasses, auxiliary frames, fit-over glasses, prescription glasses, safety glasses, swim masks, and goggles (such as ski goggles). In one embodiment, the eyewear could be incorporated in a helmet or other type of headgear.

Different embodiments of electronics in an eyewear are described in (a) U.S. Pat. No. 9,488,520, entitled, "Eyewear With Radiation Detection," which is incorporated herein by reference; (b) U.S. Pat. No. 8,905,542, entitled, "Eyewear Supporting Bone Conducting Speaker," which is incorporated herein by reference; and (c) U.S. Pat. No. 8,337,013, entitled, "Eyeglasses with RFID Tags or with a Strap," which is incorporated herein by reference.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Also, in this specification, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. An eyewear system for a user comprising:
   an eyewear frame comprising:
     a wireless communication component;
     an activity detector configured to monitor at least a user activity;
     a microphone;
     a memory storing at least a portion of voice-recognition instructions to enable recognizing voice depending on at least a voice recognition model previously trained based on machine learning in at least a server separate from the eyewear system, to allow recognizing voice at the eyewear frame without the need to wirelessly access a server;
a re-chargeable battery;
a speaker;
a controller configured to
    detect a fall of the user based on at least the activity detector, in view of such a fall,
    generate a voice output that is configured to solicit a voice response, via at least the speaker in view of the detected fall of the user, and
    analyze reaction of the user to the voice output to determine a course of action, with the analyze including analyzing voice input received via at least the microphone, as recognized at least by the at least a portion of voice-recognition instructions if the reaction of the user includes the voice input from the user;
and
a case configured for the eyewear frame to be placed in, with the case configured to charge the re-chargeable battery based on the eyewear frame being placed in the case.

2. An eyewear system as recited in claim 1, wherein the controller is configured to identify a location of the eyewear frame based on at least an electronic component in the eyewear frame.

3. An eyewear system as recited in claim 1, wherein the course of action includes sending a message to an interested party via at least the wireless communication component, at least in view of the detected fall.

4. An eyewear system as recited in claim 3,
wherein the controller is configured to identify a location of the eyewear frame based on at least an electronic component in the eyewear frame, and
wherein the message includes at least the location of the eyewear frame.

5. An eyewear system as recited in claim 1,
wherein the frame comprises a coil of wire,
wherein the case comprises a coil of wire,
wherein the charging of the re-chargeable battery is at least via induction, with at least the coil of wire in the frame becoming in proximity to at least the coil of wire in the case, and without the need for the eyewear frame to have a physical connector to be physically and electrically connected to another physical connector at the case for charging, and
wherein at least the coil of wire in the frame is around a lens holder of the eyewear frame.

6. An eyewear system as recited in claim 1,
wherein the frame comprises a coil of wire,
wherein the case comprises a coil of wire,
wherein the charging of the re-chargeable battery is at least via induction, with at least the coil of wire in the frame becoming in proximity to at least the coil of wire in the case, and without the need for the eyewear frame to have a physical connector to be physically and electrically connected to another physical connector at the case for charging,
wherein the eyewear frame includes a first and a second lens holders,
wherein the eyewear frame comprises another coil of wire,
wherein at least the coil of wire in the frame is around the first lens holder, and
wherein at least the another coil of wire is around the second lens holder.

7. An eyewear system as recited in claim 1,
wherein the frame comprises a coil of wire,
wherein the case comprises a coil of wire,
wherein the charging of the re-chargeable battery is at least via induction, with at least the coil of wire in the frame becoming in proximity to at least the coil of wire in the case, and without the need for the eyewear frame to have a physical connector to be physically and electrically connected to another physical connector at the case for charging, and
wherein at least the coil of wire in the frame is in an arm of the eyewear frame, with the coil having at least a loop configured to charge the re-chargeable battery.

8. An eyewear system as recited in claim 1, wherein the eyewear is eyeglasses with at least one lens holder.

9. An eyewear system as recited in claim 1, wherein the controller is configured to enhance hearing of the user based on at least an electrical component in the eyewear frame.

10. An eyewear system as recited in claim 1,
wherein the eyewear frame includes an electrical component configured to monitor heart rate of the user, at least via the electrical component touching skin of the user, and
wherein the controller is configured to send a message to an interested party via at least the wireless communication component, in view of a monitored heart rate of the user.

11. An eyewear system as recited in claim 1, wherein the eyewear frame is configured to be activated by voice input received via at least the microphone, as recognized by the at least a portion of voice-recognition instructions.

12. An eyewear system as recited in claim 1, wherein the course of action includes sending a message to an interested party via at least the wireless communication component, in view of the analyze the reaction of the user to identify no voice response from the user to the voice output.

13. An eyewear system as recited in claim 1, wherein the eyewear frame includes an electrical component configured to monitor heart rate of the user.

14. An eyewear system as recited in claim 13, wherein the controller is configured to send a message to an interested party via at least the wireless communication component, in view of a monitored heart rate of the user.

15. A non-transitory computer readable storage medium comprising a plurality of instructions in an eyewear frame of an eyewear system,
    with the eyewear frame comprising a wireless communication component, a microphone, a re-chargeable battery, a speaker, and a controller,
    with the plurality of instructions including voice-recognition instructions to enable recognizing voice depending on at least a voice recognition model previously trained based on machine learning in at least a server separate from the eyewear system, to allow recognizing voice at the eyewear frame without the need to wirelessly access a server,
    the eyewear system also including a case configured for the eyewear frame to be placed in, with the case configured to charge the re-chargeable battery at least based on the eyewear frame being placed in the case,
    the plurality of instructions, when executed at least by the controller, result in the controller:
    detect a fall of the user based on sensing at least an activity of user, in view of such a fall;
    generate a voice output that is configured to solicit a voice response, via at least the speaker in view of the detected fall of the user; and analyze reaction of the user to the voice output to determine a course of action, with the analyze including analyzing voice input received via at least the microphone, as recognized at least by the at least a portion of voice-recognition instructions if the reaction of the user includes the voice input from the user.

16. A non-transitory computer readable storage medium as recited in claim 15, wherein the plurality of instructions, when executed at least by the controller, result in the controller identifying a location of the eyewear frame at least based on at least an electronic component in the eyewear frame.

17. A non-transitory computer readable storage medium as recited in claim 15, wherein the plurality of instructions, when executed at least by the controller, result in the controller sending a message to an interested party via at least the wireless communication component, at least in view of the detected fall.

18. A non-transitory computer readable storage medium as recited in claim 15, wherein the plurality of instructions, when executed at least by the controller, result in the controller using at least a hearing characteristic of the user to enhance hearing of the user.

19. A non-transitory computer readable storage medium as recited in claim 15, wherein the plurality of instructions, when executed at least by the controller, result in the controller monitoring heart rate of the user based on at least an electrical component in the eyewear frame configured to monitor heart rate, with the user wearing the eyewear frame.

20. A non-transitory computer readable storage medium as recited in claim 15, wherein the plurality of instructions, when executed at least by the controller, result in the controller:
  sending a message to an interested party via at least the wireless communication component, at least in view of the detected fall; and
  using at least a hearing characteristic of the user to enhance hearing of the user.

21. A non-transitory computer readable storage medium as recited in claim 20, wherein the plurality of instructions, when executed at least by the controller, result in the controller identifying a location of the eyewear frame at least based on at least an electronic component in the eyewear frame.

22. An eyewear frame for a user comprising:
  a wireless communication component;
  a microphone;
  a memory storing at least a portion of voice-recognition instructions to enable recognizing voice depending on at least a voice recognition model previously trained based on machine learning in at least a server separate from the eyewear system, to allow recognizing voice at the eyewear frame without the need to wirelessly access a server;
  a re-chargeable battery;
  a speaker;
  and
  a controller configured to
    detect a fall of the user based on sensing at least an activity of user, in view of such a fall;
    generate a voice output that is configured to solicit a voice response, via at least the speaker in view of the detected fall of the user, and
    analyze reaction of the user to the voice output to determine a course of action, with the analyze including analyzing voice input received via at least the microphone, as recognized at least by the at least a portion of voice-recognition instructions if the reaction of the user includes the voice input from the user,
  wherein the re-chargeable battery of the eyewear frame is configured to be charged by placing the eyewear frame into a case.

23. An eyewear frame for a user as recited in claim 22, wherein the controller is configured to send a message to an interested party via at least the wireless communication component, at least in view of the detected fall.

24. An eyewear frame for a user as recited in claim 22 wherein the course of action includes sending a message to an interested party via at least the wireless communication component, in view of the analyze the reaction of the user to identify no voice response from the user to the voice output.

25. An eyewear frame for a user as recited in claim 22 wherein the controller is configured to identify a location of the eyewear frame based on at least an electronic component in the eyewear frame.

26. An eyewear frame for a user as recited in claim 25, wherein the controller is configured to send a message to an interested party via at least the wireless communication component, at least in view of the detected fall, and wherein the message includes at least the location of the eyewear frame.

27. An eyewear frame for a user as recited in claim 22,
  wherein the frame comprises a coil of wire,
  wherein the case comprises a coil of wire,
  wherein the charging of the re-chargeable battery is at least via induction, with at least the coil of wire in the frame becoming in proximity to at least the coil of wire in the case, and without the need for the eyewear frame to have a physical connector to be physically and electrically connected to another physical connector at the case for charging, and
  wherein at least the coil of wire in the frame is around a lens holder of the eyewear frame.

28. An eyewear frame for a user as recited in claim 22, wherein the eyewear frame is configured to be activated by voice input received via at least the microphone, as recognized by the at least a portion of voice-recognition instructions software code, with the voice input including at least a preset word.

29. An eyewear frame for a user as recited in claim 22, wherein the controller is configured to enhance hearing of the user based on at least an electrical component in the frame and at least a hearing characteristic of the user.

30. An eyewear frame for a user as recited in claim 29,
  wherein the controller is configured to send a message to an interested party via at least the wireless communication component, at least in view of the detected fall,
  wherein the controller is configured to identify a location of the eyewear frame based on at least an electronic component in the eyewear frame, and
  wherein the eyewear frame is configured to be activated by voice input received via at least the microphone, as recognized by the at least a portion of voice-recognition instructions, with the voice input including at least a preset word.

31. An eyewear frame for a user as recited in claim 30, wherein the message includes at least the location of the eyewear frame.

* * * * *